United States Patent
Shukla

(10) Patent No.: US 11,330,519 B1
(45) Date of Patent: May 10, 2022

(54) DEVICE POWER MANAGEMENT TRANSITIONS IN WIRELESS NETWORKS

(71) Applicant: Amazon Technologies, Inc., Seattle, WA (US)

(72) Inventor: Ashish Kumar Shukla, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 122 days.

(21) Appl. No.: 16/790,569

(22) Filed: Feb. 13, 2020

(51) Int. Cl.
  *H04W 52/02* (2009.01)
  *H04W 12/06* (2021.01)
  *H04W 12/03* (2021.01)
  *H04W 80/02* (2009.01)
  *H04W 84/12* (2009.01)
  *H04W 88/02* (2009.01)

(52) U.S. Cl.
  CPC ....... *H04W 52/0209* (2013.01); *H04W 12/03* (2021.01); *H04W 12/06* (2013.01); *H04W 80/02* (2013.01); *H04W 84/12* (2013.01); *H04W 88/02* (2013.01)

(58) Field of Classification Search
  CPC . H04W 36/08; H04W 36/0055; H04W 92/20; H04W 36/0016; H04W 36/0058; H04W 52/0209; H04W 12/03; H04W 12/06; H04W 80/02; H04W 84/12; H04W 88/02
  See application file for complete search history.

(56) References Cited

U.S. PATENT DOCUMENTS

| | | | | |
|---|---|---|---|---|
| 8,767,601 B2 * | 7/2014 | Park | ........... | H04W 52/0229 370/311 |
| 9,295,096 B1 * | 3/2016 | Shukla | ........... | H04W 76/14 |
| 2013/0163498 A1 * | 6/2013 | Senga | ........... | H04L 69/161 370/311 |
| 2013/0176925 A1 * | 7/2013 | Sampath | ........... | H04W 52/0209 370/311 |
| 2016/0073340 A1 * | 3/2016 | Xue | ........... | H04W 74/0816 455/522 |

OTHER PUBLICATIONS

LAN/MAN Standards Committee of the IEEE Computer Society, "Part 11: Wireless LAN Medium Access Control (MAC) and Physical Layer (PHY) Specifications," Dec. 7, 2016, pp. 1-3534, IEEE Std 802.11-2016, The Institute of Electrical and Electronics Engineers, Inc., New York, NY, USA.
"U-APSD Explained," Nov. 9, 2011, 12 pages.

* cited by examiner

*Primary Examiner* — Brandon J Miller
(74) *Attorney, Agent, or Firm* — Kilpatrick Townsend & Stockton LLP

(57) ABSTRACT

Techniques for improving the power management of devices are described. In an example, a device transitions into a power save mode. While in the power save mode, the device performs a number of operations. The operations include transitioning into an awake state and determining that the device has no data to transmit to a network access device. The operations also include determining a sequence number associated with data transmission to the network access device. The operations further include generating a frame that includes a header field and a payload field. The header field includes the sequence number and power management data. The power management data indicates a transition of the device to the awake state. Additionally, the operations include transmitting the frame to the network access device.

20 Claims, 12 Drawing Sheets

DEVICE POWER MANAGEMENT TRANSITIONS IN WIRELESS NETWORKS

BACKGROUND

In a wireless environment, such as in an IEEE 802.11 wireless network, an access point communicates wirelessly with computing devices. At the data link layer (e.g., the L2 layer), the access point can receive, from a source, frames that include an address of a computing device and can transmit such frames to the computing device. Conversely, the access point can receive, from the computing device, frames that include an address of a destination and can transmit such frames to the destination.

A computing device can transition in and out of a power save mode. When in the power save mode, the computing device may not transmit and/or receive data, thereby saving power.

BRIEF DESCRIPTION OF THE DRAWINGS

Various embodiments in accordance with the present disclosure will be described with reference to the drawings, in which.

DETAILED DESCRIPTION

Figure 1:
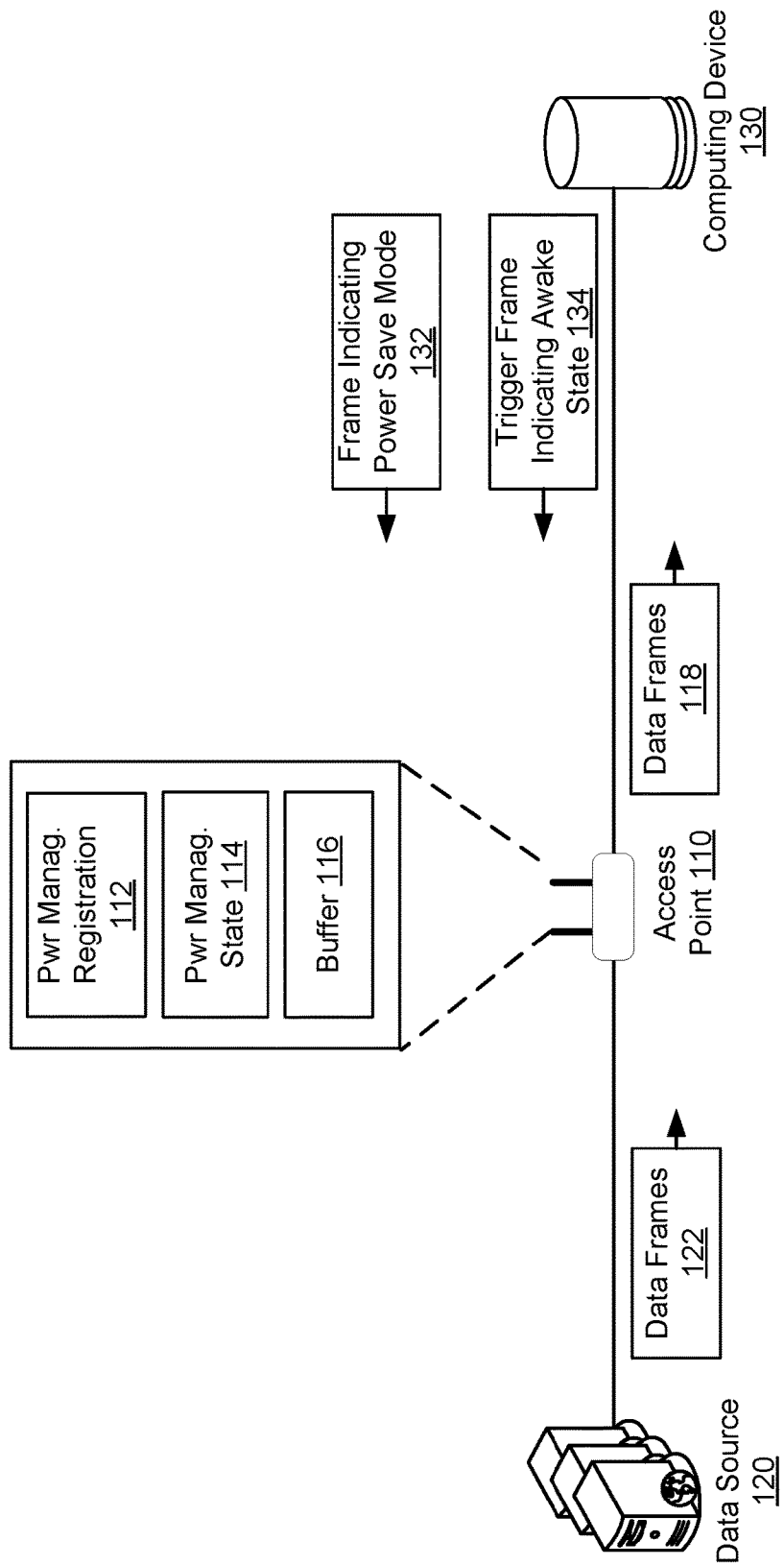
FIG. 1 illustrates an example computing environment for managing data transmissions of a device based on power management data according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In existing systems, a computing device connects to a network via a network access device according to a communication standard (e.g., to a local access network (LAN) via a wireless access point according to the IEEE 802.11 standard). For example, the IEEE 802.11 standard defines multiple wireless protocols including a protocol for saving power. Per this protocol, an idle computing device (e.g., a computing device that is not transmitting or receiving data) enters a power save mode for a time interval (e.g., one hundred milliseconds) to save power. In this mode, the computing device's receiver is powered off or is in standby to reduce the power consumption. Another IEEE 802.11 protocol defines a sleep-awake cycle mode and is referred to as the IEEE 802.11 unscheduled automatic power save delivery (U-APSD) protocol. The sleep-awake cycle mode is supplementary to the power save mode and reduces the network latency, while still benefiting from the reduction to the power consumption provided by the power save mode. In particular, when compliant with the IEEE 820.11 standard, the computing device is compliant with the power save mode and is optionally compliant with the IEEE U-APSD protocol. When compliant with the IEEE U-APSD protocol, and while in the power save mode, the computing device can enter an awake state according to a sleep-awake cycle (e.g., twenty milliseconds after entering the power save mode) to check whether data is available for transmission from the network access device. If so, the computing device receives the data. In the awake state, the receiver is powered on and is operational to receive the data. Once the data is received or if no data is available, the computing device transitions back to a sleep state to restart the next sleep-awake cycle (e.g., the computing device remains in the sleep state for the next twenty milliseconds). In the sleep state, the receiver is powered off or is on standby, similarly to the computing device's state in the power save mode (the exception being that the computing device transitions again to the awake state in twenty milliseconds rather than at the end of the power save mode's time interval of one hundred milliseconds). Generally, the sleep-awake cycle is much shorter than the time interval of the power save mode (e.g., twenty milliseconds for the sleep-awake cycle versus one-hundred milliseconds for the time interval of the power save mode). In this way, and while remaining in the power save mode, the computing device can determine whether data can be received from the network access device, where the data may have been stored in a buffer of the network access device. If so, rather than waiting until the end of the power save mode, the computing device can receive the data by transitioning out of the sleep state and into the awake state, thereby reducing the latency associated with the data reception. Otherwise, the computing device can return to the sleep state, thereby continuing to reduce its power consumption.

As further described in connection with FIG. 4, in various situations related to the processing of redundant frames, the computing device may erroneously remain in the awake state when it should actually transition into the sleep state, thereby inefficiently consuming power. A reason for this inefficiency includes, for instance, the network access device ignoring an indication from the computing device that the computing device has transitioned into the awake state, resulting in the network access device assuming that the computing device is in the sleep state and, hence, not informing the computing device that it can transition back into the sleep state because no data is available for the computing device. In this case, the computing device erroneously remains in the awake state. As also described in connection with FIG. 7, in other situations, the quality of the communication channel between the computing device and the network access device may result in data frame losses. In such situations, the network access device may transmit data frames while the computing device is not operational to receive such data frames. Embodiments of the present disclosure improve the power consumption metrics (e.g., reduce the power consumption) and the error frame rate (e.g., reduce the loss of data frames).

In particular, embodiments of the present disclosure involve the computing device using a trigger frame to indicate the transition into the awake state, where the trigger frame includes a sequence number unique to the trigger frame (e.g., not redundantly used for other trigger frames). In an example, the trigger frame can include a payload field that stores the sequence number. For instance, the trigger frame can be a non-quality of service (QoS) null frame, such as a data frame or a management frame including any of an address resolution protocol (ARP) frame or a vendor-specific frame. Because the sequence number is unique to the trigger frame, the network address device does not ignore the trigger frame and, instead, processes this trigger frame and transmits, as applicable, an indication to the computing device that no additional data is available for the computing device. In turn, the computing device can properly transition into the sleep state and need not incorrectly remain in the awake state when no data is available.

Embodiments of the present disclosure also involve the computing device using a delay interval prior to transitioning into the sleep state. By delaying this transition, the computing device can defer the transition into the sleep state for a sufficient time to determine whether a retransmission is received from the network access device, where the retransmission indicates that no additional data is available (e.g., a received retransmission indicates that that the network access device likely did not determine that the device is transitioning into the sleep state). If the retransmission is not received, the computing device transitions into the sleep state at the end of the delay interval. If the retransmission is received, the computing device can transmit an acknowledgement of the retransmission to the network access device prior to actually performing this transition. Hence, the network access device can more likely determine the transition into the sleep state, despite channel conditions that would have otherwise prevented this determination.

To illustrate, consider the following use case. A wireless audio device (or some other internet of things (IoT) device) is connected to a home LAN via a wireless access point by using a WiFi connection to the wireless access point according to the 802.11 standard. The wireless audio device also implements the 802.11 U-APSD protocol. Audio content is streamed to the wireless audio device from a content source via the wireless access point. The streaming can occur in data blocks, where a data block includes multiple data frames and is downloaded to the wireless audio device via the wireless access point. To save power, the wireless audio device enters a power save mode between the download of two data blocks for a period of at least one-hundred milliseconds (or some other configurable time interval). Further, the 802.11 U-APSD cycle of the wireless audio device is set to twenty milliseconds (or some other configurable cycle, generally shorter than the time interval of the power save mode). Accordingly, the wireless audio device transitions into the awake state in twenty milliseconds after entering into the power save mode.

While in the power save mode and despite determining that no audio data exists to transmit to the wireless access point, the wireless audio device generates a sequence number based on a counter that maintains a count of data frames associated with audio data transmission to the wireless access point. The sequence number is unique to next audio data transmission, such that no two audio data transmissions have the same sequence number (unless redundancy of the transmissions is desired). The wireless audio device also generates an ARP frame that includes the sequence number in its payload field and transmits the ARP frame (rather than transmitting a QoS null frame because no audio data exists) as the trigger frame to the wireless access point. The trigger frame indicates the transition into the sleep state and is not ignored by the wireless access point because of the sequence number. Accordingly, the wireless access point indicates, as applicable, to the wireless audio device that no audio data is available to download. In turn, the wireless audio device properly transitions into the sleep state.

In addition, rather than immediately transitioning into the sleep state once the indication of no audio data to download is received, the wireless audio device can delay this transition by five milliseconds (or some other determined delay interval). If a retransmission of the indication is received, the wireless audio device transmits an acknowledgement of the retransmission and transitions into the sleep state upon the elapse of the five milliseconds. Otherwise, the wireless audio device need not transmit the acknowledgment and transitions into the sleep state upon the elapse of the five milliseconds.

Embodiments of the present disclosure provide several technological improvements over existing systems. As described herein above and in the following sections of the present disclosure, the embodiments improve the power consumption metrics and the latency associated with using sleep-awake cycles within a power save mode, such as the use of an 802.11 U-APSD cycle. Further, by relying on a computing device generating a specific trigger frame and using a specific delay interval, the improvements to the power consumption metrics and the latency can be achieved without changing, or with minimal change, to the configuration of a network access device.

In the interest of clarity of explanation, various embodiments of the present disclosure are described in conjunction with an access point that supports a wireless transmission and a computing device that connects to the access point according to the IEEE 802.11 standard and that implements the IEEE 802.11 U-APSD for power saving. However, the embodiments are not limited as such and similarly apply to any other type of connections, whether wired or wireless, and to any other type of network access devices. A network access device is generally a transmission device that manages, provides, controls, and/or facilitates access of one or more other computing devices to a computer network including a local area network, a wide area network, or a mesh network. A network hub, a network switch, a network router, an access point, a node in a mesh network, and any combination of such devices are examples of a network access device. For instance, the embodiments can be implemented in any type of computer network that is based on a IEEE 802.11 standard, such as tunneled direct link setup (TDLS) peer, ad-hoc independent basic service set (IBSS), and mesh basic service (MBSS).

FIG. 1 illustrates an example computing environment for managing data transmissions of a device based on power management data according to an embodiment of the present disclosure. As illustrated, the computing environment includes an access point 110, a data source 120, and a computing device 130. However, the computing environment can include a different number of access points, data sources, and/or computing devices. In an example, the access point 110 supports the capability of a power save mode with a sleep-awake cycle, whereby data frames are transmitted or stored for the computing device 130 depending on whether the computing device 130 is in a power save mode or not, and on whether the computing device 130 is in an awake state while in the power save mode.

In an example, the data source 120 includes a computing resource that stores data (e.g., audio and/or video content, files, digital media, etc.) and that transmits the data in data frames 122 at the data link layer. For instance, the computing resource is a content server that supports multimedia streaming.

The access point 110 is a wireless access point that manages the wireless access of the computing device 130 to a home network (e.g., a LAN that the computing device 130 is registered with as its home network) and to a public network (e.g., including the internet). The wireless access point also receives the data frames 122. Some of the data frames 122 are transmitted immediately (e.g., without being stored in a memory buffer), whereas other ones are stored (e.g., in the memory buffer) for a time duration prior to transmission to the computing device 130. The transmitted data frames from the access point 110 are shown as data frames 118 in FIG. 1. The home network includes the access point 110 and the computing device 130.

The computing device 130 can be a device that includes suitable hardware and software (e.g., one or more processors and one or more memories storing computer-readable instructions) to support the receipt and transmission of frames, including data frames and management frames, at the data link layer. For instance, the computing device can be any of a mobile phone such as a smartphone, a tablet, a laptop, a personal computer, a smart speaker, a smartwatch, a smart appliance, or any other IoT device or user device.

In an example, if the capability of the power save mode with the sleep-awake cycle should be available to computing device 130, the access point 110 stores power management registration data 112 in association with an identifier of the computing device 130 (e.g., in association with the media access control (MAC) address and/or the internet protocol (IP) address of the computing device 130). In particular, the power management registration data 112 associates the computing device 130 with this capability. For instance, during a connection set-up, the access point 110 and the computing device 130 complete a registration process by which the power management registration data 112 is generated. The power management registration data 112 indicates that the computing device 130 has been registered with the access point 110, where the registration indicates that upon the computing device 130 entering into a power save mode, no data is to be transmitted to the computing device 130 unless the computing device 130 is in a awake state according to the IEEE 802.11 U-APSD protocol. The power management registration data 112 can be stored as information in a table, where the MAC address of the computing device 130 is one entry of a row and a bit is set to "1" in another entry of the row. A "1" bit indicates that the capability is applicable to the computing device 130 having the MAC address, whereas a "0" bit indicates that the capability is not applicable to the computing device.

In addition, the access point 110 stores power management state data 114 indicating an operational state of the computing device 130 controlling the data transmission to the computing device 130. In particular, the power management state data 114 indicates whether the computing device 130 is in the power save mode or not and, if in the power save mode, whether the computing device is in the awake state or a sleep state according to the IEEE 802.11 U-APSD protocol. A power save mode for a computing device represents an operational mode in which the computing device uses a reduced amount of power compared to its normal operational mode. An awake state indicates that, while the computing device is in the power save mode, the computing device can operate some or all of the receive functionalities of the computing device to receive data. A sleep state indicates that, while the computing device is in the power save mode, the computing device cannot operate some or all of its receive functionalities to receive data. In an illustration, a table can be used to store the power management state data 114. For instance, an entry in a row of the table can include the MAC address of the computing device 130 and another entry in the row can include two bits: the first bit (e.g., the most significant bit) corresponds to the power save mode and the second bit (e.g., the least significant bit) corresponds to the IEEE 802.11 U-APSD state. If the first bit is set to "1," the "1" bit indicates that the computing device 130 having the MAC address is in the power save mode, whereas a "0" bit indicates that the computing device is not in the power save mode. If the second bit is set to "1," the "1" bit indicates that the computing device 130 having the MAC address is in the sleep state, whereas a "0" bit indicates that the computing device is not in the awake state.

Further, the access point 110 includes a memory buffer 116. Frames (whether data frames or management frames) that are received by the access point 110 and are addressed to a computing device (e.g., include a MAC address of the computing device as the receiver address in the MAC header of the frame) can be stored in the memory buffer 116 when the power and saving data 114 indicates that the computing device is in power save mode and the sleep state. Otherwise, such frames are transmitted without being stored in the memory buffer 116. Frames (whether data frames or management frames) that are in the memory buffer 116 and that are addressed to a computing device can be transmitted from the memory buffer 116 to the computing device upon a change to the power saving mode 114 indicating that the computing device is out of the power save mode or is in the power save mode but in the awake state.

In an example, the computing device 130 is entering a power save mode. Accordingly, the computing device 130 transmits a frame 132 to the access point 110, where the frame 132 indicates that the computing device 130 is entering the power save mode. For instance, the MAC header of the frame 132 includes power management (PM) data indicating a transition of the computing device 130 into the power save mode (e.g., a PM bit set to "1"). If the computing device 130 has pending data or management controls to transmit, the frame 132 is a data frame or a management frame. The frame 132 can be protected (and is referred to herein as a protected frame) by using one or more types of protection including, for instance, encryption of the payload of the frame 132, authentication of the frame 132, and/or authentication of the MAC header of the frame 132. In an example, the protected frame is a frame that has an encrypted payload per the IEEE 802.11 encryption standard, where the encrypted payload includes additional authentication data (AAD) generated based on some of the information in the MAC header and encrypted with an encryption key. The ADD can be generated, for instance, as a hash of the MAC header. If the computing device 130 has no pending data or management controls to transmit, the computing device 130 may transmit a QoS null frame that has an empty payload as the frame 132, or for improved security, can transmit a protected frame as the frame 132, such as an ARP frame. In this case, the payload of the protected frame (e.g., the ARP frame) includes AAD and is protected and/or the protected frame can include a checksum.

Upon receiving the frame 132 from the computing device 130, the access point 110 can check the power management registration data 112 to determine whether the capability of the power save mode with the sleep-awake cycle is applicable to the computing device 130. If so, the access point 110 may update the power management state data 114 applicable to the computing device 130 to indicate the transition into the power save mode. Otherwise, the access point 110 may determine that the capability is not applicable to the computing device 130 and can ignore the frame 132.

Similar processing can be performed when the computing device 130 exits the power save mode. Here, the frame 132 includes PM data indicating a transition of the computing device 130 out of the power save mode (e.g., a PM bit set to "0"). Upon receiving this frame 132, the access point 110 can check the power management registration data 112 to determine whether the capability of the power save mode with the sleep-awake cycle is applicable to the computing device 130. If so, the access point 110 may update the power management state data 114 applicable to the computing device 130 to indicate the transition out of the power save mode. Otherwise, the access point 110 may determine that the capability is not applicable and can ignore the frame 132.

Further, while the computing device 130 is in the power save mode, the computing device 130 may enter the awake state. In this case, the computing device 130 may send a trigger frame 134 indicating the awake state. The trigger frame 134 can include a sequence number unique to the trigger frame. For instance, the computing device 130 transmits a data frame or a management frame as the trigger frame 134, even when the computing device 130 has no data or management control to transmit to the access point 110 and would have otherwise transmitted a QoS null frame per the IEEE 802.11 U-APSD protocol. In this case, the trigger frame 134 can be an ARP frame that includes the sequence number in the payload field, or a vendor specific frame having a payload field and a vendor specific element, where the sequence number is included in the payload field and/or the vendor specific element. In addition, the trigger frame 134 can be protected (e.g., by using one or more types of protection including, for instance, encryption of the payload of the frame 134, authentication of the frame 134, and/or authentication of the MAC header of the frame 134).

Upon receiving the trigger frame 134 from the computing device 130, the access point 110 can check the power management registration data 112 to determine whether the capability of the power save mode with the sleep-awake cycle is applicable to the computing device 130. If so, the access point 110 may update the power management state data 114 applicable to the computing device 130 to indicate the transition into the awake state. Otherwise, the access point 110 may determine that the capability is not applicable to the computing device 130 and can ignore the frame 132.

On the other hand, upon transitioning out of the awake state and into the sleep state while being in the power save mode, the computing device 130 need not transmit a frame indicating this transition into the access point 110. Instead, upon determining that no data frame (e.g., no additional data if other data was transmitted when the computing device 130 was in the awake state) is available for transmission to the computing device 130, the access point 110 may indicate this determination to the computing device 130 (e.g., by using end of service period (EOSP) data indicating that no data is available, such as by transmitting a QoS Null frame with an EOSP bit set to "1" or setting the EOSP bit to "1" in the last transmitted data frame to the computing device 130). The access point 110 may also check the power management registration data 112 to determine whether the capability of the power save mode with the sleep-awake cycle is applicable to the computing device 130. If so, the access point 110 may update the power management state data 114 applicable to the computing device 130 to indicate the transition into the sleep state. Otherwise, the access point 110 may determine that the capability is not applicable to the computing device 130 and may not perform the update.

Accordingly, upon receiving a data frame from the data source 120, the access point determines a destination address of the data frame. The access point 110 uses the destination address in a look-up of the power management registration data 112. If destined to the computing device 130 (e.g., based on a match between the destination address and the computing device's 130 MAC address in the power management registration data 112), the access point 110 determines that the capability of the power save mode with the sleep-awake cycle is applicable to the computing device 130 and proceeds to check whether the computing device 130 is in the sleep state or the awake state. Otherwise, the access point immediately transmits the data frame without necessarily storing in the memory buffer 116. When the capability is applicable, the access point 110 uses the destination address in a look-up of the power management state data 114. If destined to the computing device 130 (e.g., based on a match between the destination address and the computing device's 130 MAC address in the power management state data 114), the access point 110 determines whether the computing device 130 is in the sleep state or the awake state. If in the sleep state, the access point 110 stores the data frame in the memory buffer 116. If in the awake state, the access point transmits any data frame stored in the memory buffer 116 along with the data frame received from the data source 120.

Figure 2:
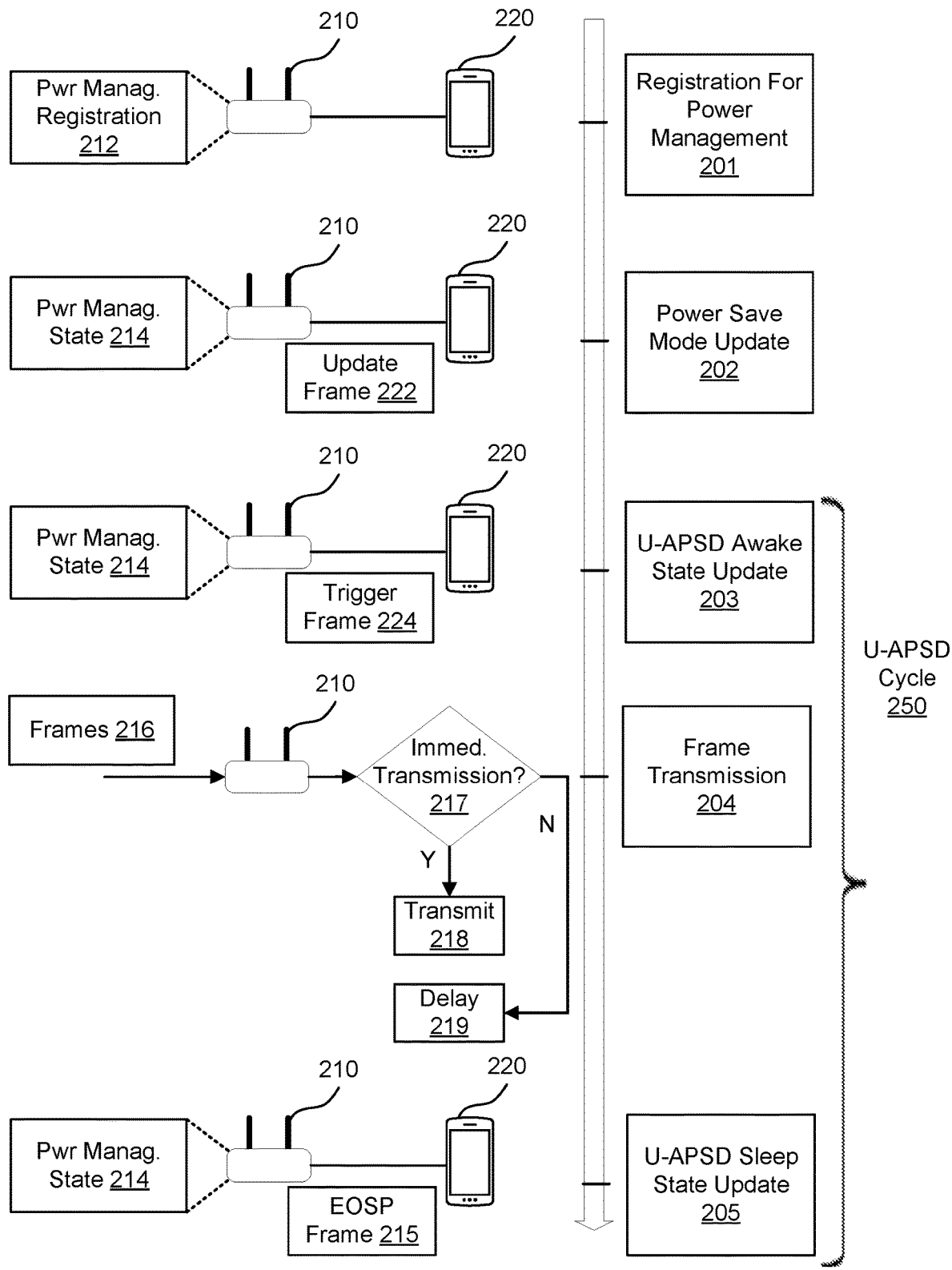
FIG. 2 illustrates example stages for managing data transmissions of a device according to an embodiment of the present disclosure.

FIG. 2 illustrates example stages for managing data transmissions of a device according to an embodiment of the present disclosure. In an example, an access point 210 manages frame transmissions to computing devices including a computing device 220. The computing device 220 may transition into and out of a power save mode and, while in the power save mode, may transition into and out of an awake state. The transmission of frames from the access point 110 to the computing device can depend on the power save mode and the awake state. The access point 210 and the computing device 220 are examples of the access point 110 and the computing device 130, respectively, of FIG. 1. As illustrated, managing the frame transmissions can be performed in multiple stages, including a first stage 201 for a registration to the protected power management mode, a second stage 202 for a power saving mode update, a third stage 203 for an awake state update, a third stage 203 for an awake state update a fourth state 204 for transmitting the frames, and a fifth state 205 for a sleep state update.

In an example, during the first stage 201, the access point 210 advertises its capability for supporting the power save mode and the IEEE 802.11 U-APSD functionality of awake and sleep states. For instance, the access point 210 transmits a frame that includes a MAC header indicating the capability. The frame can be any of a beacon frame, a probe response frame, or an association response frame. The MAC header can include an extended capabilities element and/or a vendor specific element that indicates the capability. Such a MAC header can include one or more bits indicating whether frames to transition into and out of the power save mode are to be protected or not. Such a MAC header can also include one or more bits indicating whether trigger frames to transition into the sleep state are to be protected or not.

Under the first stage 201, the computing device 220 can also transmit a frame indicating a request for the capability. For instance, this request can be sent in a frame and can indicate whether the computing device 220 supports the power save mode and the IEEE 802.11 U-APSD functionality of awake and sleep states. The frame can be any of a probe request frame, an authentication request frame, or an association request frame. Similar to the frame of the access point 210, here the frame can be a vendor specific frame that includes an extended capabilities element and/or a vendor specific element in the MAC header. The vendor specific element can also be added to TDLS, IBSS, MBSS Beacons, and/or Management frames.

Upon receiving the request from the computing device 220, the access point 210 can generate and store protected power management registration data 212 (and can initialize power management state data 214 to default values for indicating that the computing device 220 is not in the power save mode and is not in the sleep state). The protected power management registration data 212 is usable as part of processing requests received by the access point 210 and indicating that the computing device 220 is transitioning into the power save mode or out of the power save mode, similar to the protected power management registration data 112 described in connection with FIG. 1.

Although FIG. 2 illustrates that the first stage 201 includes the access point 210 advertising its capability and the computing device 220 requesting the capability, the embodiments of the present disclosure are not limited as such. For example, the access point 210 can advertise the capability, but the computing device 220 need not request it. Instead, the computing device 220 can automatically (e.g., without further registration with the access point 210) use the capability based on a determination that the access point 210 provides the capability. In another example, the access point 210 may not advertise the capability, but the computing device 220 may request it. In this example, the access point 210 can generate and store the protected power management registration data 212 upon receipt of a frame from the computing device 220 requesting the capability. In yet another example, the access point 210 does not advertise the capability and the computing device 220 does not request it. Instead, each of such devices can be configured to use the capability before and/or after a data connection is established between the two devices.

During the second stage 202, the computing device 230 transmits data to the access point 210 indicating that the computing device 230 has entered the power save mode or has exited the power save mode. The data can be sent as an update frame 222 with a power management bit set to "1" or "0" for entering or leaving, respectively, the power mode and the access point 210 may respond with an acknowledgment to the computing device 230. In particular, the power management bit can be set in a frame control within a MAC header of the update frame 222. In one example, the update frame 222 can be QoS null frame (if the computing device 220 has no data to transmit to the access point 210), a data frame, or a management frame (the data frame is used when the computing device 222 has data to transmit to the access point 210, and/or when no such data exists, but the update frame 222 is to be protected; similarly, the management frame is used when the computing device 222 has management control to transmit to the access point 210, and/or when no such management control exists, but the update frame 222 is to be protected). In an example, the update frame 222 is a protected data frame or a protected management frame including, for instance, a checksum and an encrypted payload that in turn includes AAD generated based on the frame's MAC header. In this example, the access point 210 processes the protected frame by authenticating the protected frame according to the checksum, decrypting the payload, authenticating the MAC header according to the AAD, and retrieving the value of the power management bit. In both examples (e.g., whether update frame 222 is protected or not), the access point 210 generates or updates the power management state data 214 to indicate the power save mode. The power management state data 214 can include an identifier of the computing device 220, such as its MAC address, a first bit to have the same value as the power management bit, and a second bit indicating whether the computing device 220 is in the sleep state or in the awake state. The sleep state can be the default upon the computing device 220 indicating that it has transitioned into the power save mode, or upon the access point 210 transmitting the last data frame to the computing device 220 or a frame indicating that no data is available to the computing device 220. The awake state can be the default upon the computing device 220 indicating that it has transitioned out of the power save mode.

During the third stage 203, the computing device 230 transmits data to the access point 210 indicating that the computing device 230 has transitioned into the awake state. In particular the computing device initiates a cycle of transitioning between the sleep state and the awake state according to the IEEE 802.11 U-APSD protocol. This cycle is shown in FIG. 2 as a U-APSD cycle 250. Accordingly, the computing device 220 transmits a trigger frame 224 to indicate the transition into the awake state. Even when the computing device 220 has no data to transmit to the access point 210 (in which case, a QoS null frame would be transmitted per the IEEE 802.11 U-APSD protocol), the computing device 220 can generate and transmit a non-QoS null frame, such as a data frame or a management frame, as the trigger frame 224. The trigger frame 224 can include, in addition to a PM bit set to "1," a sequence number unique to the trigger frame 224 such that the access point 210 may determine that the trigger frame 224 is not redundant with a previously transmitted frame and may not ignore the trigger frame 224. For instance, the trigger frame 224 can be an ARP frame or a vendor specific frame that includes the sequence number, as further described in connection with the next figures. In an example, the trigger frame 224 can be protected by including, for instance, a checksum and an encrypted payload that in turn includes AAD generated based on the frame's MAC header. In this example, the access point 210 processes the protected frame by authenticating the protected frame according to the checksum, decrypting the payload, authenticating the MAC header according to the AAD, and retrieving the sequence number. In both examples (e.g., whether trigger frame 224 is protected or not), the access point 210 updates the power management state data 214 to indicate the sleep state. For instance, the second bit in the power management state data 214 is set to indicate the awake state (e.g., set to "0").

During the fourth stage 204, the access point 210 receives frames 216, such as data frames and/or management frames.

Each of the frames 216 include a MAC header that, in turn, includes the MAC address of the computing device 220 as the destination address. Accordingly, the access point 210 determines that the frames 216 are addressed to the computing device 220. The access point 210 uses the MAC address to look-up the power save mode data 214 and generate a decision 217 of whether the frames 216 should be immediately transmitted to the computing device 220 or stored in a memory buffer for a delayed transmission. In particular, if the computing device 220 is not operating in the power save mode, or if the computing device is in the power save mode and in the awake state, the frames 216 are transmitted 218 without being buffered. If the computing device 220 is in the power save mode and in the sleep state, the frames 216 are buffered and the transmission of the buffered frames is delayed 219 until the computing device 220 transitions into the awake state while in the power save mode or until the computing device transitions out of the power save mode (or until a time out time duration, after which the buffered frames 216 are deleted and not transmitted).

During the fifth stage 205, the computing device 220 transitions out of the awake state and into the sleep state, thereby completing the U-APSD cycle 250. The length of the U-APSD cycle corresponds to a service period. The service period is an interval of time during which the device is in the awake state and at the end of which the device enters the sleep state. The timing between two service periods can be configured to be twenty milliseconds (or some other configurable value) and is generally shorter than the length of time during which the computing device 220 remains in the power save mode (e.g., one-hundred milliseconds). In an example, the access point 210 determines that no data frames or management frames are available to transmit to the computing device 220 during the U-APSD cycle 250 (e.g., during the fourth stage 204, no frames were received). In this case, the access point 210 can transmit a QoS null frame with an EOSP bit set to "1" to the computing device 220 to indicate that no data frames or management frames are available to the computing device 220. Alternatively, rather than transmitting a QoS null frame, the access point 210 can transmit a data frame or a management frame that includes the EOSP bit and that is protected (by including, for instance, a checksum and an encrypted payload that in turn includes AAD generated based on the frame's MAC header). In another example, upon transmitting the last frame (e.g., a data frame or a management frame) under the fourth stage 204, the access point 210 includes the EOSP bit set to "1" in this last frame to indicate to the computing device 220 that no additional frames are available to the computing device 220. In this example, the last frame can also be protected. In both examples, the frame including the EOSP bit is shown in FIG. 2 as an EOSP frame 215. Based on the transmission of the EOSP frame 215, the access point 210 can update the power management state data 214 to indicate that the computing device 220 has transitioned into the sleep state (e.g., by changing the second bit in the power management state data 214 to a "1"). This update to the power management state data 214 can depend on receiving an acknowledgement from the computing device 220 of the EOSP frame 215. If no such acknowledgement is received, the access point 210 may not update the power management state data 214 and may attempt a number of retransmissions of the EOSP frame 215 until receiving the acknowledgement (or a time out period) to then complete the update.

Further, during the fifth stage 205, and upon the computing device 220 receiving the EOSP frame 215 and/or any retransmission thereof, the computing device 220 can transmit an acknowledgement about this receipt to the access point 210. Rather than immediately transitioning into the sleep state, the computing device 220 can determine a delay interval and defer the transition into the sleep mode until an elapse of the delay interval. Further, the computing device can extend a length of the delay interval by a time interval depending on whether a retransmission of the EOSP frame 215 is received or not (e.g., the receipt of the retransmission can result in the time extension; otherwise, the delay interval is not further extended).

Figure 3:
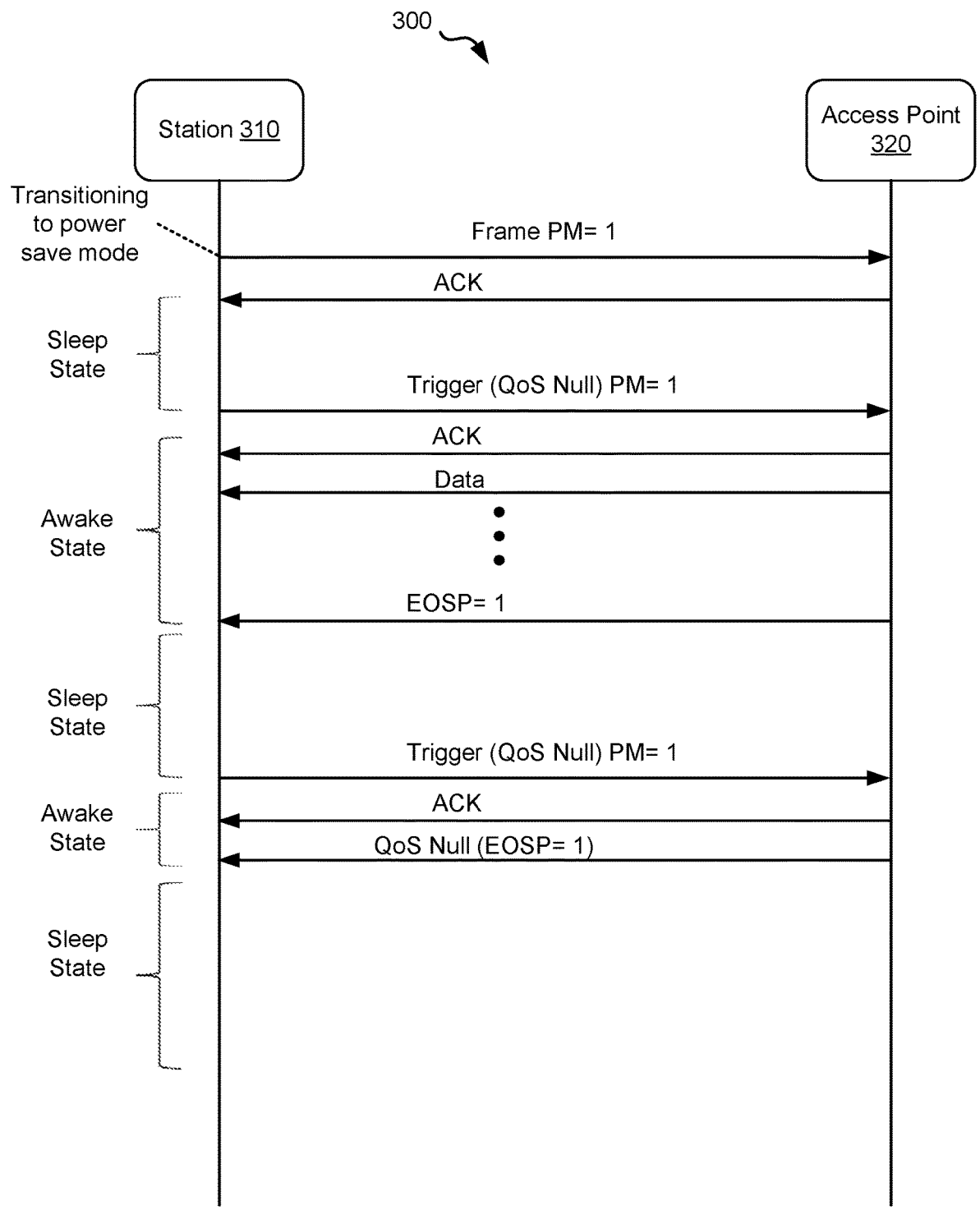
FIG. 3 illustrates an example of a sequence diagram for transitioning between an awake state and a sleep state.

FIG. 3 illustrates an example of a sequence diagram 300 for transitioning between an awake state and a sleep state. As illustrated, a station 310 is in communication with an access point 320, and both devices implement the IEEE 802.11 U-APSD protocol. The sequence diagram 300 includes a number of steps that are performed in an order of the arrows shown in FIG. 3, starting with the top arrow and ending with the bottom arrow.

As illustrated, the station 310 transmits a frame with a PM bit set to "1" to the access point 320 to indicate a transition of the station 310 into a power save mode. The frame can be a QoS null frame if the station 310 has no data or management control to transmit, data frame if the station 310 has data to transmit, or a management frame if the station 310 has management control to transmit and the frame may not be protected. In response, the access point 320 transmits an acknowledgement to the station 310 to indicate that the frame was received. At that point in time, the station 310 transitions into a sleep state according to the IEEE 802.11 U-APSD protocol.

The station 310 remains in the sleep state until a detection of a trigger event. In an example, the trigger event can be time-based, such as an elapse of a predefined time interval for a service period (e.g., twenty milliseconds). Upon determining the trigger event (e.g., the elapse of twenty milliseconds from the transition into the power save mode), the station 310 transitions into the awake state. This transition includes transmitting a QoS null frame with a PM bit set to "1" as a trigger frame when the station 310 has no data or management control to transmit. In response, the access point 320 transmits an acknowledgement to the station 310 to indicate that the trigger frame was received.

In the example diagram 300 of FIG. 3, the access point 320 has buffered data (e.g., data frames stored in a memory buffer) for the station 310 upon the station's 310 transition into the power save mode and prior to the station's 310 transition into the awake state. In this example, the access point 320 transmits the data to the station 310 by transmitting the buffered data frames. In the last transmitted frame, the access point 320 includes an EOSP bit set to "1" to indicate that no additional data is available for download to the station 310. At that point in time, the station 310 transitions out of the awake state and into the sleep state.

The station 310 remains in the sleep state until a detection of a next trigger event. For instance, upon the elapse of twenty milliseconds from the transition into the sleep state, the station 310 determines that a transition into the awake state is to be performed. Accordingly, the station 310 transitions into the awake state by, at least, transmitting another QoS null frame with a PM bit set to "1" as a next trigger frame. In response, the access point 320 transmits an acknowledgement to the station 310 to indicate that this trigger frame was received.

In the example diagram 300 of FIG. 3, the access point 320 has no buffered data (e.g., data frames stored in the memory buffer) for the station 310 upon the station's 310 transition into the awake state. In this example, the access point 320 transmits a QoS null frame that includes an EOSP bit set to "1" to the station 310 to indicate that no additional data is available for download to the station 310. At that point in time, the station 310 transitions out of the awake state and into the sleep state.

The transition into and out of the sleep state and awake state are repeated over multiple U-APSD cycles until the station 310 transitions out of the power save mode. The process of transitioning back into the power save mode and between the sleep state and awake state is repeated over time.

Figure 4:
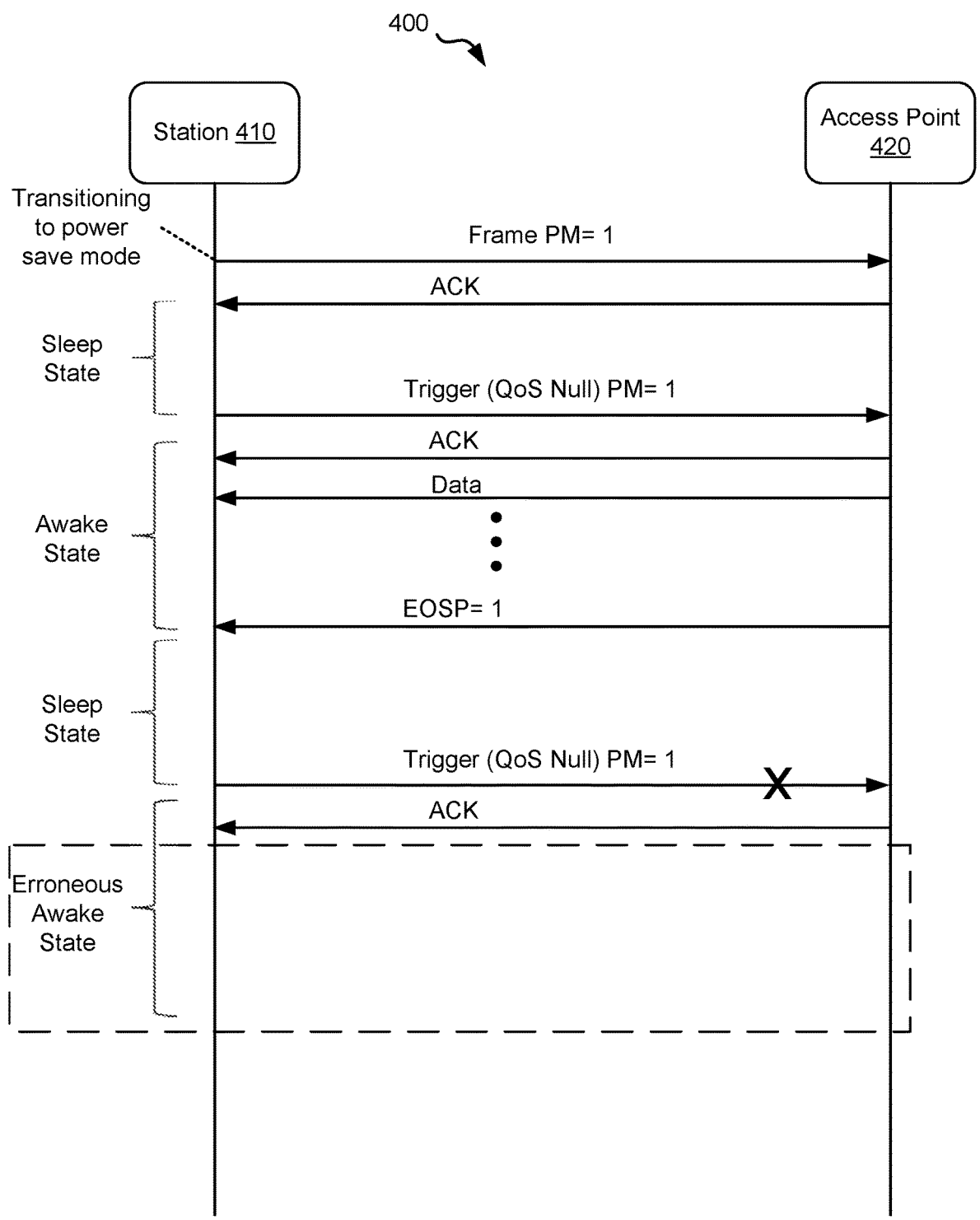
FIG. 4 illustrates an example of a sequence diagram, where a device erroneously remains in an awake state.

FIG. 4 illustrates an example of a sequence diagram 400, where a device, such as a station 410 in communication with an access point 420, erroneously remains in an awake state. The sequence diagram 400 can be performed in accordance with the IEEE 802.11 U-APSD protocol. As demonstrated by this sequence diagram 400, the device can be in the awake state, whereas it should be in the sleep state because no data is available for the device to receive, and, thus, power can be inefficiently consumed by the device despite implementing the IEEE 802.11 U-APSD protocol. As illustrated, the station 410 is in communication with the access point 420, and both devices implement the IEEE 802.11 U-APSD protocol but do not support, fully or partially, the capability of a power save mode with a sleep-awake cycle. The sequence diagram 400 includes a number of steps that are performed in an order of the arrows shown in FIG. 4, starting with the top arrow and ending with the bottom arrow.

As illustrated, the station 410 transmits a frame with a PM bit set to "1" to the access point 420 to indicate a transition of the station 410 into a power save mode. The frame can be a QoS null frame if the station 410 has no data or management control to transmit, a data frame if the station 410 has data to transmit, or a management frame if the station 410 has management control to transmit and the frame may not be protected. In response, the access point 420 transmits an acknowledgement to the station 410 to indicate that the frame was received. At that point in time, the station 410 transitions into the sleep state according to the IEEE 802.11 U-APSD protocol.

The station 410 remains in the sleep state until a detection of a trigger event. In an example, the trigger event can be time-based, such as an elapse of a predefined time interval for a service period (e.g., twenty milliseconds). Upon determining the trigger event (e.g., the elapse of twenty milliseconds from the transition into the power save mode), the station 410 transitions into the awake state. For this transition, the station 410 determines that it has no data or management control to transmit to the access point 420. Accordingly, and per the IEEE U-APSD protocol, the transition includes transmitting a QoS null frame with a PM bit set to "1" as a trigger frame. In addition, the station 410 implementing the IEEE U-APSD may not include a sequence number unique to the QoS null frame (or its value can be set to a default value, such as zero). In response, the access point 420 transmits an acknowledgement to the station 410 to indicate that the trigger frame was received.

In the example diagram 400 of FIG. 4, the access point 420 has buffered data (e.g., data frames stored in a memory buffer) for the station 410 upon the station's 410 transition into the power save mode and prior to the station's 410 transition into the awake state. In this example, the trigger frame is the first trigger frame received by the access point 420. Accordingly, the access point 420 determines that the sequence number included in the trigger frame has not been used before. Based on this determination, the access point 420 transmits the data to the station 410 by transmitting the buffered data frames. In the last transmitted frame, the access point 420 includes an EOSP bit set to "1" to indicate that no additional data is available for download to the station 410. At that point in time, the station 410 transitions out of the awake state and into the sleep state.

The station 410 remains in the sleep state until a detection of a next trigger event. For instance, upon the elapse of twenty milliseconds from the transition into the sleep state, the station 410 determines that a transition into the awake state is to be performed. Accordingly, the station 410 transitions into the awake state by, at least, transmitting another QoS null frame with a PM bit set to "1" as a next trigger frame. The sequence number included in the QoS null frame has the same value as the sequence number transmitted in the previous QoS null frame. In response, the access point 420 transmits an acknowledgement to the station 410 to indicate that this trigger frame was received. Here, however, because the QoS sequence number is not unique to this currently received QoS null frame, the access point 420 erroneously determines that the QoS null frame is redundant with the previously received QoS null frame. Because of this redundancy determination, the access point 420 ignores the currently received QoS null frame (as illustrated with an "X" mark in FIG. 4) and, hence, ignores that the station 410 transitioned into the awake state and, instead, maintains that the station 410 is in the sleep state. Accordingly, the access point 420 does not start transmitting any data to the access point 420 if such data is available, or a QoS null frame with an EOSP bit set to "1" if no such data is available. Because the station 410 does not receive the data followed by the EOSP bit set to "1" or the QoS null frame with the EOSP bit set to "1," the station 410 cannot determine that it is more proper to transition into the sleep state. Instead, the computing device erroneously remains in the awake state, thereby consuming unnecessary power to receive data when no such data is actually available to download by the station 410.

The station 410 can erroneously remain in the awake state until, for instance, the station 410 has data or management control to transmit to the access point 420 or upon exit from the power save mode. In the former case, the station 410 can send a data frame or a management frame to the access point 420 and, in response, the access point 420 can determine that the device is in the awake state and transmit, as applicable, buffered data to the station 410. In the latter case, the station 410 can send a data frame or a management frame to the access point 420 indicating the transition out of the power save mode and, in response, the access point 420 can determine that the device has exited the power save mode and transmit, as applicable, buffered data to the station 410.

Figure 5:
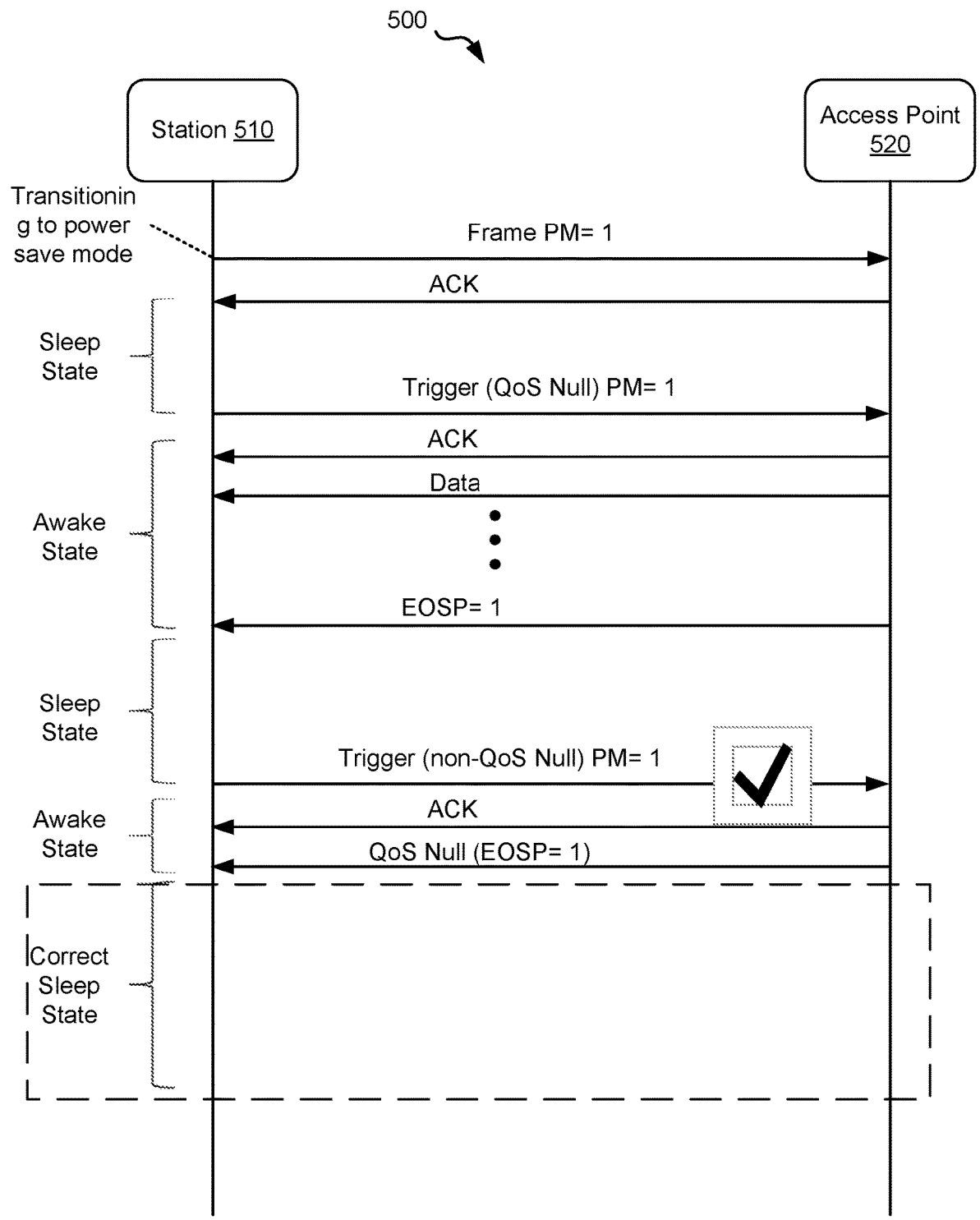
FIG. 5 illustrates an example of a sequence diagram that uses a trigger frame such that a device properly transitions between an awake state and a sleep state according to an embodiment of the present disclosure.

FIG. 5 illustrates an example of a sequence diagram 500 that uses a trigger frame such that a device properly transitions between an awake state and a sleep state according to an embodiment of the present disclosure. The device is illustrated as a station 510 that is in communication with an access point 520. The sequence diagram 500 can be performed in accordance with the IEEE 802.11 U-APSD protocol, while also implementing the capability of a power save mode with a sleep-awake cycle. The station 510 and the access point 520 are examples of the computing device 220 and the access point 210 of FIG. 2, respectively. The sequence diagram 500 includes a number of steps that are performed in an order of the arrows shown in FIG. 5, starting with the top arrow and ending with the bottom arrow.

As illustrated, the station 510 transmits a frame with a PM bit set to "1" to the access point 520 to indicate a transition of the station 510 into a power save mode. This frame can be similar to the update frame 222 of FIG. 2 and can be protected. In response, the access point 520 transmits an acknowledgement to the station 510 to indicate that the frame was received. At that point in time, the station 510 transitions into the sleep state according to the IEEE 802.11 U-APSD protocol.

The station 510 remains in the sleep state until a detection of a trigger event. In an example, the trigger event can be time-based, such as an elapse of a predefined time interval for a service period (e.g., twenty milliseconds). Upon determining the trigger event (e.g., the elapse of twenty milliseconds from the transition into the power save mode), the station 510 transitions into the awake state. For this transition, the station 510 determines that it has no data or management control to transmit to the access point 510. In addition, the station 510 determines that this is the first transition into the awake state and, thus, no previous frame about this transition was transmitted to the access point 520. Accordingly, the transition includes transmitting a QoS null frame with a PM bit set to "1" as a trigger frame per the IEEE 802.11 U-APSD protocol. Alternatively, and as explained in connection with the next steps, the station 510 can transmit a trigger frame that includes a sequence number unique to the trigger frame. In both cases, the access point 520 responds with an acknowledgement transmitted to the station 510 to indicate that the trigger frame was received.

In the example diagram 500 of FIG. 5, the access point 520 has buffered data (e.g., data frames stored in a memory buffer) for the station 510 upon the station's 510 transition into the power save mode and prior to the station's 510 transition into the awake state. In this example, the trigger frame is the first trigger frame received by the access point 520. Accordingly, the access point 520 determines that the sequence number included in the trigger frame has not been used before, even when the trigger frame is the QoS null frame. Based on this determination, the access point 520 transmits the data to the station 510 by transmitting the buffered data frames. In the last transmitted frame, the access point 520 includes an EOSP bit set to "1" to indicate that no additional data is available for download to the station 510. At that point in time, the station 510 transitions out of the awake state and into the sleep state.

The station 510 remains in the sleep state until a detection of a next trigger event. For instance, upon the elapse of twenty milliseconds from the transition into the sleep state, the station 510 determines that a transition into the awake state is to be performed. Accordingly, the station 510 transitions into the awake state. Here, even when the station 510 determines that no data is to be transmitted to the access point 520, the station 510 generates a unique sequence number to be included in the trigger frame that indicates the transition into the awake state. This trigger frame can be a QoS null frame that includes the unique sequence number and a power management bit set to "0," thereby indicating the transition into the awake state and that the access point 520 should not determine that the QoS null frame is redundant with a previously transmitted QoS null frame. Alternatively, the trigger frame can be, even though no data is to be transmitted, a data frame or a management frame that includes the unique sequence number and the PM bit set to "0" and that can be protected for additional security. In response, the access point 520 transmits an acknowledgement to the station 510 to indicate that this trigger frame was received. Here, because the sequence number is unique to the received trigger frame (whether a QoS null frame, a data frame protected or not, or a management frame protected or not), the access point 520 properly determines that the currently received trigger frame is not redundant with a previously receive trigger frame, does not ignore the currently received trigger frame, and, instead, processes the currently received trigger frame to determine the transition of the station to the awake state (this processing as illustrated with a check mark in FIG. 5).

Accordingly, if the access point 520 has buffered data for the station 510, the access point 520 transmits the buffered data and includes, in the last transmitted data frame, an EOSP bit set to "1". Alternatively, and as illustrated in the example diagram 500 of FIG. 5, no data is available to transmit to the station 510 and the access point 510 transmits in one instance a QoS null frame with EOSP set to "1."

The station 510 receives the EOSP bit set to "1" (e.g., in a last transmitted data frame or in a QoS null frame) and transitions into the sleep state. The transition can be deferred by a delay interval as further described in connection with FIG. 8. Because the station 510 transitions into the sleep state and does not erroneously remain in the awake state, as is the case with the sequence diagram 400 of FIG. 4, the station 510 need not inefficiently consume power to enable receive functionalities when no data is actually available for download by the station 510.

Although FIG. 5 illustrates the use by the station 510 of a non-QOS null frame that includes a unique sequence number, the access point 520 can similarly use such a frame even when the access point 520 has no data to transmit to the station 510. In particular and rather than transmitting a QoS null frame, the access point 520 can transmit a data frame, a management frame with an EOSP bit set to one even when no data is available for transmission to the station 510, where the used frame (data or management) includes a sequence number unique to the transmission of the user frame. For instance, the used frame can be an ARP frame and/or a vendor specific frame and may be protected.

Figure 6:
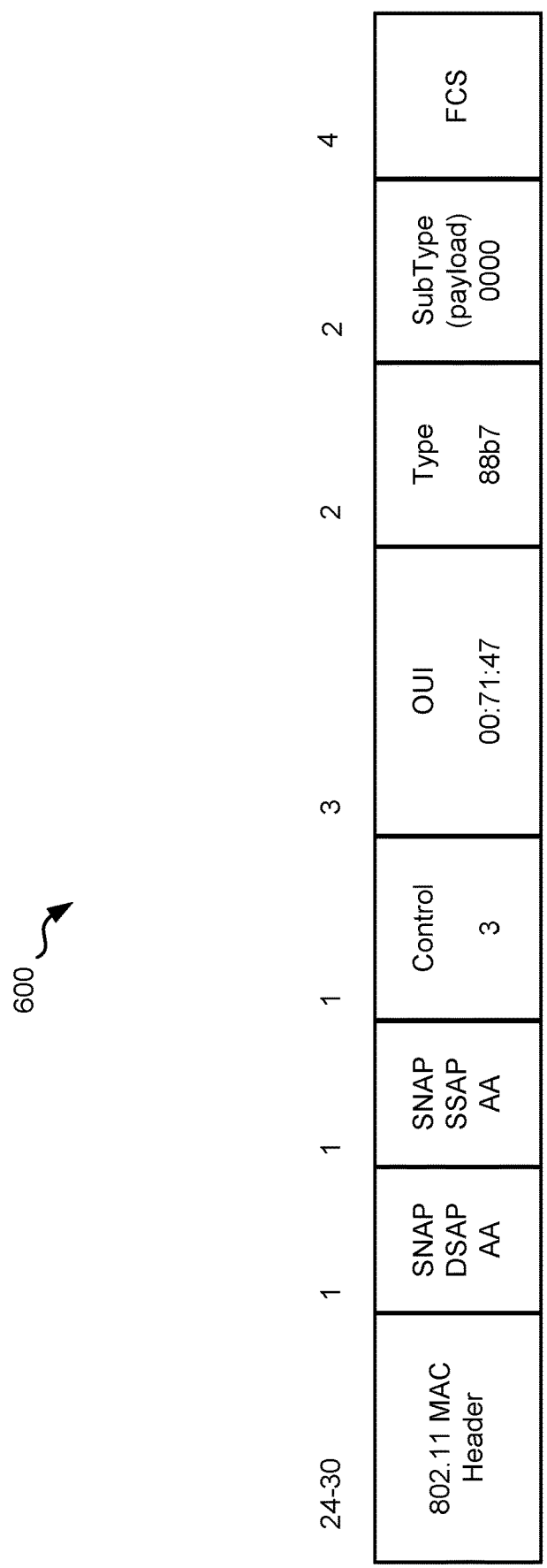
FIG. 6 illustrates an example of a trigger frame according to an embodiment of the present disclosure.

FIG. 6 illustrates an example of a trigger frame 600 according to an embodiment of the present disclosure. The trigger frame 600 is a data frame that includes a header field and a payload field. The header field includes a sequence number unique to the trigger frame 600 and power management data, such as a PM bit, usable to indicate a transition of a device transmitting the trigger frame 600 to an awake state. In an example, the trigger frame 600 is an ARP frame. In another example and specifically as illustrated in in FIG. 6, the trigger frame 600 can be a vendor specific frame.

As illustrated, the trigger frame 600 is a vendor specific frame that includes a logical link control (LLC) header and a subnetwork access protocol (SNAP) header. The sequence number is included in the LLC header. The payload field is included in the SNAP header. In addition, the payload field can be set to have zero length, thereby reducing the total size of the trigger frame 600.

In particular, the trigger frame 600 includes a MAC header that is between twenty-four and thirty octets long. The trigger frame 600 also includes the LLC header having a one destination service access point (DSAP) octet, a one source service access point (SSAP) octet, and a one control octet. The trigger frame 600 also includes the SNP header having a three organizationally unique identifier (OUI) octet (which can be set to a vendor OUI), a two type octet, a two subtype octet (which can contain the payload and, if the trigger frame 600 is not protected, the payload can be set to have zero length), and a four frame check sequence (FCS) octet. In comparison to a QoS null frame, the trigger frame 600 with the vendor specific element has an additional eight octets overhead. This trigger frame 600 uses Vendor OUI (as part of the OUI field in the SNAP header). Its Type field is set to Extended Ether Type Vendor Specific as defined by IEEE 802-2014 standard, section 9.2.4 OUI Extended Ether Type.

Figure 7:
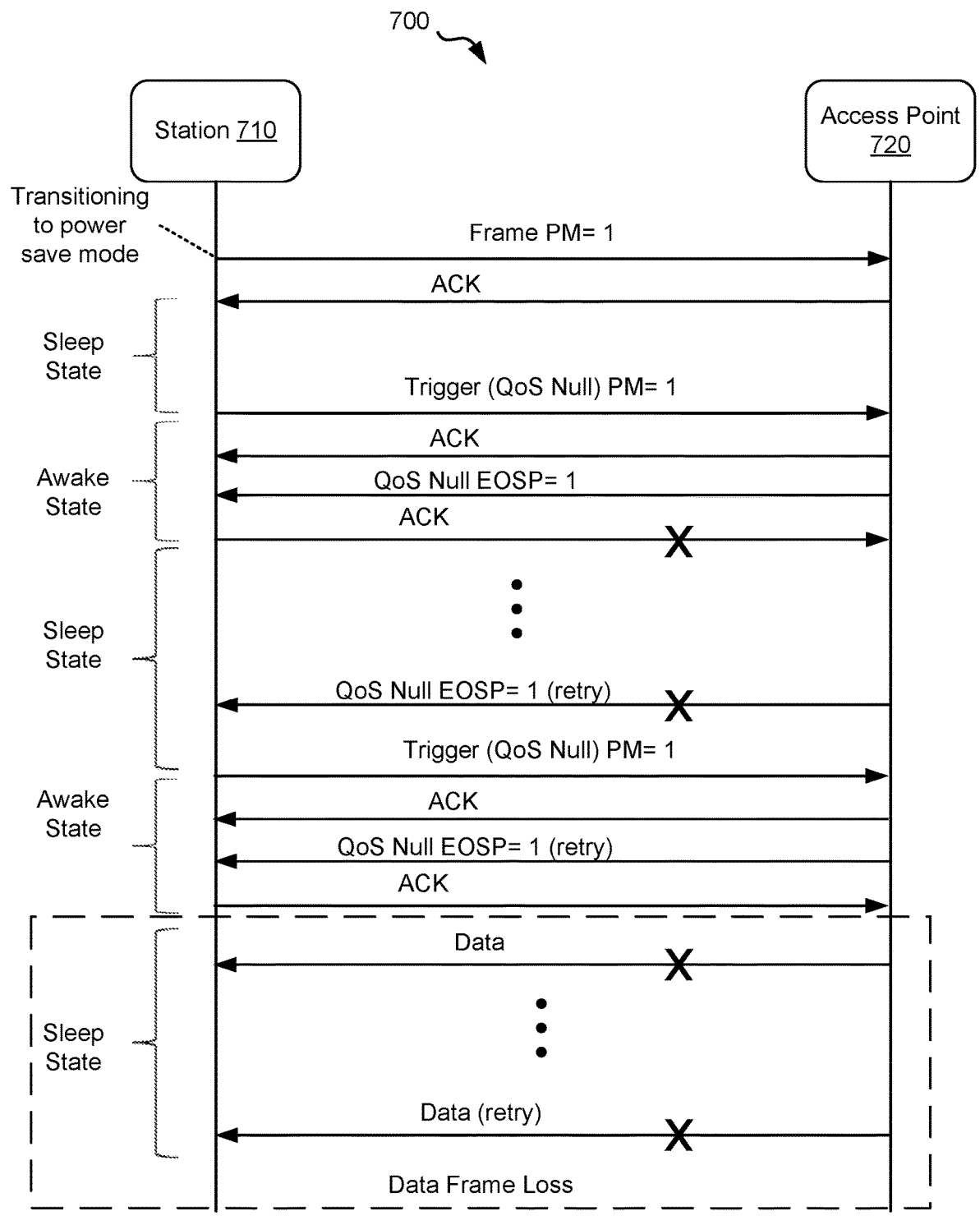
FIG. 7 illustrates an example of a sequence diagram where a data frame loss may occur.

FIG. 7 illustrates an example of a sequence diagram 700, where a data frame loss may occur. The sequence diagram 700 can be performed in accordance with the IEEE 802.11 U-APSD protocol. As demonstrated by this sequence diagram 700, station 710 can be in the sleep state, whereas it should be in the awake state to receive data from an access point 720, and, thus, resulting in the data frame loss despite implementing the IEEE 802.11 U-APSD protocol. As illustrated, the station 710 is in communication with the access point 720, and both devices implement the IEEE 802.11 U-APSD protocol but do not support, fully or partially, the capability of a power save mode with a sleep-awake cycle. The sequence diagram 700 includes a number of steps that are performed in an order of the arrows shown in FIG. 7, starting with the top arrow and ending with the bottom arrow.

As illustrated, the station 710 transmits a frame with a PM bit set to "1" to the access point 720 to indicate a transition of the station 710 into a power save mode. The frame can be a QoS null frame if the station 710 has no data or management control to transmit, a data frame if the station 710 has data to transmit, or a management frame if the station 710 has management control to transmit and the frame may not be protected. In response, the access point 720 transmits an acknowledgement to the station 710 to indicate that the frame was received. At that point in time, the station 710 transitions into the sleep state according to the IEEE 802.11 U-APSD protocol.

The station 710 remains in the sleep state until a detection of a trigger event. In an example, the trigger event can be time-based, such as an elapse of a predefined time interval for a service period (e.g., twenty milliseconds). Upon determining the trigger event (e.g., the elapse of twenty milliseconds from the transition into the power save mode), the station 710 transitions into the awake state. For this transition, the station 710 determines that it has no data or management control to transmit to the access point 720. Accordingly, and per the IEEE U-APSD protocol, the transition includes transmitting a QoS null frame with a PM bit set to "1" as a trigger frame. In addition, the station 710 implementing the IEEE U-APSD may not include a sequence number unique to the QoS null frame (or its value can be set to a default value, such as zero). In response, the access point 720 transmits an acknowledgement to the station 710 to indicate that the trigger frame was received.

In the example diagram 700 of FIG. 7, the access point 720 has no buffered data (e.g., data frames stored in a memory buffer) for the station 710 upon the station's 710 transition into the power save mode and prior to the station's 710 transition into the awake state. In this example, the trigger frame is the first trigger frame received by the access point 720. Accordingly, the access point 720 determines that the sequence number included in the trigger frame has not been used before. Based on this determination, the access point 720 transmits, to the station 710, a QoS null frame with an EOSP bit set to "1" to indicate that no data is available.

Upon receiving the QoS null frame, the station 710 responds with a transmission of an acknowledgement about this receipt to the access point 720 and transitions into the sleep state per the IEEE 802.11 U-APSD protocol. However, due to conditions of the communication channel (e.g., the wireless medium), the access point 720 does not receive the acknowledgment (as indicated with the "X" mark in FIG. 7). Because no acknowledgement is received, the access point 720 retransmits the QoS null frame with the EOSP bit set to "1" in a retry. However, because the station 710 has already entered the sleep state, the station 710 does not receive the retransmission and does not transmit an acknowledgement about the receipt of the transmission. The access point 720 can attempt a number of re-tries, and would not receive the proper acknowledgement while the station 710 remains in the sleep state.

The station 710 remains in the sleep state until a detection of a next trigger event. For instance, upon the elapse of twenty milliseconds from the transition into the sleep state, the station 710 determines that a transition into the awake state is to be performed. Accordingly, the station 710 transitions into the awake state by, at least, transmitting another QoS null frame with a PM bit set to "1" as a next trigger frame to indicate the transition. In response, the access point 720 transmits an acknowledgement to the station 710 to indicate that this trigger frame was received. However, the station 710 can also receive one of the re-transmissions of the QoS null frame with the EOSP bit set to "1" and responds with an acknowledgment. Hence, the station 710 can erroneously determine that no data is available to download from the access point 720 by relying on a EOSP retry. Accordingly, the station 710 transitions again to the sleep state, but this transition can be incorrect because it is in response to the EOSP retry.

As illustrated in FIG. 7, having received the trigger frame indicating the transition into the awake state, the access point 720 has data to transmit to the station 710 and transmits such data using one or more data frames. However, the station 720 by this time has erroneously transitioned into the sleep state and the station 710 is not aware of this transition. Hence, the transmitted data frame(s) are not received by the station 710 (as illustrated with an "X" mark in FIG. 7). Further, the access point 720 does not receive an acknowledgement from the station 710 about receipt of the data frame(s). Hence, the access point 720 retransmits the data frame(s) in retries, but also does not receive the corresponding acknowledgement (as also illustrated with "X" mark in FIG. 7), resulting in the lost data frame(s) and wasted computing overhead and network bandwidth.

Figure 8:
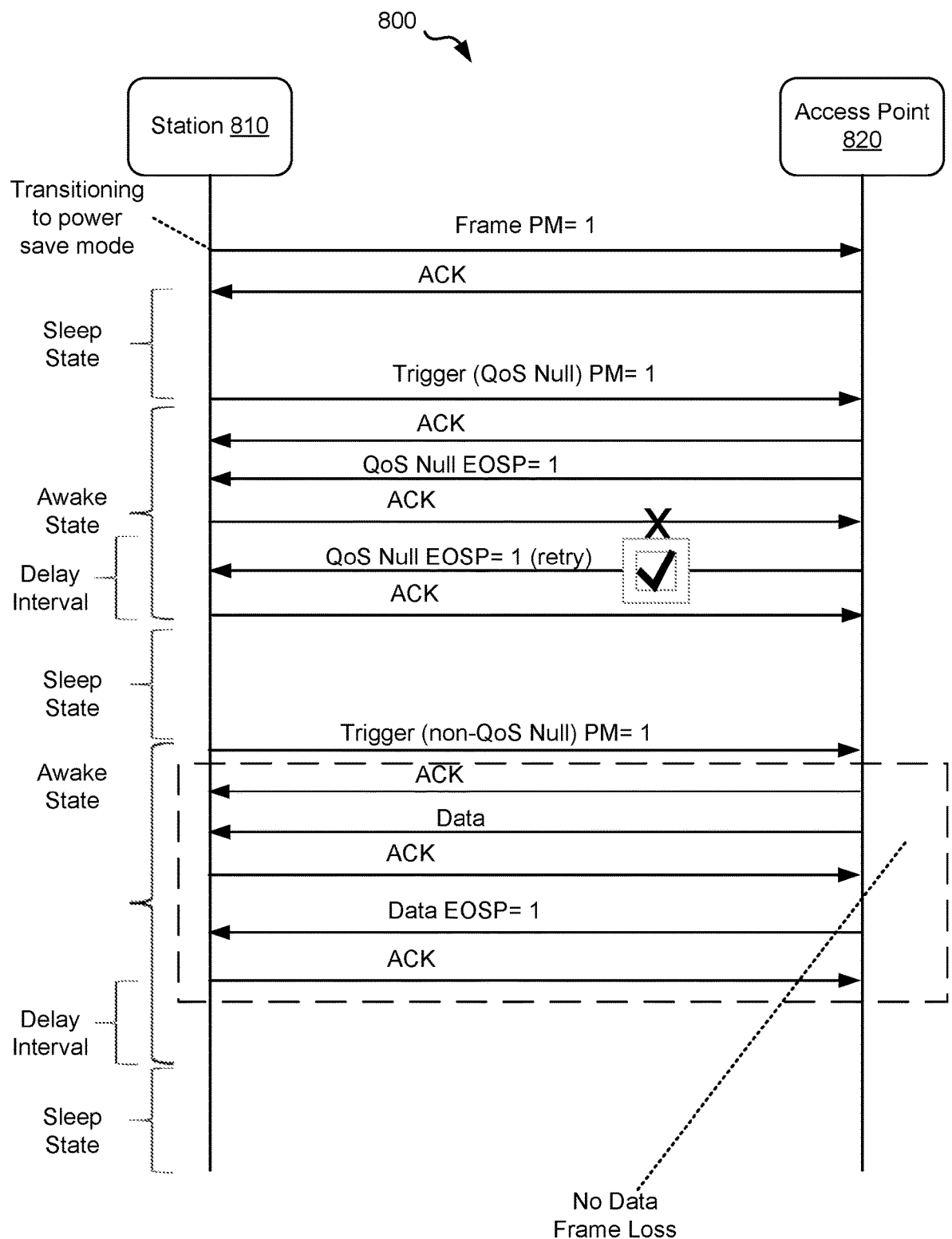
FIG. 8 illustrates an example of a sequence diagram that uses a delay interval for transitioning into a sleep state according to an embodiment of the present disclosure.

FIG. 8 illustrates an example of a sequence diagram 800 that uses a delay interval for transitioning into a sleep state according to an embodiment of the present disclosure. The sequence diagram 800 is performed by a station 810 that is in communication with an access point 820 in accordance with the IEEE 802.11 U-APSD protocol, while also implementing the capability of a power save mode with a sleep-awake cycle. The station 810 and the access point 820 are examples of the computing device 220 and the access point 210 of FIG. 2, respectively. The sequence diagram 800 includes a number of steps that are performed in an order of the arrows shown in FIG. 8, starting with the top arrow and ending with the bottom arrow.

As illustrated, the station 810 transmits a frame with a PM bit set to "1" to the access point 820 to indicate a transition of the station 810 into a power save mode. This frame can be similar to the update frame 222 of FIG. 2 and can be protected. In response, the access point 820 transmits an acknowledgement to the station 810 to indicate that the frame was received. At that point in time, the station 810 transition into the sleep state according to the IEEE 802.11 U-APSD protocol.

The station 810 remains in the sleep state until a detection of a trigger event. In an example, the trigger event can be time-based, such as an elapse of a predefined time interval for a service period (e.g., twenty milliseconds). Upon determining the trigger event (e.g., the elapse of twenty milliseconds from the transition into the power save mode), the station 810 transitions into the awake state. For this transition, the station 810 determines that it has no data or management control to transmit to the access point 810. In addition, the station 810 determines that this is the first transition into the awake state and, thus, no previous frame about this transition was transmitted to the access point 820. Accordingly, the transition includes transmitting a QoS null frame with a PM bit set to "1" as a trigger frame per the IEEE 802.11 U-APSD protocol. Alternatively, and as explained in connection with the next steps, the station can 810 can transmit a trigger frame that includes a sequence number unique to the trigger frame. In both cases, the access point 820 responds with an acknowledgement transmitted to the station 810 to indicate that the trigger frame was received.

In the example diagram 800 of FIG. 8, the access point 820 has no buffered data (e.g., data frames stored in a memory buffer) for the station 810 upon the station's 810 transition into the power save mode and prior to the station's 810 transition into the awake state. In this example, the trigger frame is the first trigger frame received by the access point 820. Accordingly, the access point 820 determines that the sequence number included in the trigger frame has not been used before. Based on this determination, the access point 820 transmits, to the station 810, a QoS null frame with an EOSP bit set to "1" to indicate that no data is available.

Upon receiving the QoS null frame, the station 810 responds with a transmission of an acknowledgement about this receipt to the access point 820 and transitions into the sleep state per the IEEE 802.11 U-APSD protocol. However, due to conditions of the communication channel (e.g., the wireless medium), the access point 820 does not receive the acknowledgment (as indicated with the "X" mark in FIG. 8). And, unlike the sequence diagram 700 of FIG. 7, the station 810 determines a delay interval and defers the transition into the sleep state until an elapse of the delay interval.

During this delay interval and because no acknowledgement is received, the access point 820 retransmits the QoS null frame with the EOSP bit set to "1" in a retry. Because the station 810 has not entered the sleep state yet, the station 810 receives the retransmission (as indicated with a check mark in FIG. 8) and, in response, transmits an acknowledgement about the receipt of this retransmission and then transitions into the sleep state. Accordingly, the access point 820 can more accurately determine the transition of the station 810 into the sleep state. Although not illustrated in FIG. 8, if a number of retransmission(s) is (are) received during the delay interval, the station 810 can extend the time length of the delay interval a number of times.

The station 810 remains in the sleep state until a detection of a next trigger event. For instance, upon the elapse of twenty milliseconds from the transition into the sleep state, the station 810 determines that a transition into the awake state is to be performed. Accordingly, the station 810 transitions into the awake state. Here, even when the station 810 determines that no data is to be transmitted to the access point 820, the station 810 generates a unique sequence number to be included in the trigger frame that indicates the transition into the awake state. This trigger frame can be a QoS null frame that includes the unique sequence number and a power management bit set to "0," thereby indicating the transition into the awake state and that the access point 820 should not determine that the QoS null frame is redundant with a previously transmitted QoS null frame. Alternatively, the trigger frame can be, even though no data is to be transmitted, a data frame or a management frame that includes the unique sequence number and the PM bit set to "0" and that can be protected for additional security. In response, the access point 820 transmits an acknowledgement to the station 810 to indicate that this trigger frame was received. Here, because the sequence number is unique to the received trigger frame (whether a QoS null frame, a data frame protected or not, or a management frame protected or not), the access point 820 properly determines that the currently received trigger frame is not redundant with a previously received trigger frame, does not ignore the currently received trigger frame, and, instead, processes the currently received trigger frame to determine the transition of the station to the awake state (this processing as illustrated with a check mark in FIG. 8).

As illustrated in FIG. 8, at this point, the access point 820 has data to transmit to the station 810. Accordingly, such data is transmitted in one or more data frame(s) because the access point 820 has accurately determined that the station 810 is in the awake state. The station 810 responds with an acknowledgment. The access point 820 continues the transmission of the data frames until a last transmitted data frame that includes an EOSP bit set to "1." Here, also the station 810 responds with an acknowledgement and, rather than immediately entering the sleep state, defer this transition by the delay interval. As illustrated with the dashed box, and unlike the result of performing the sequence diagram 700 of FIG. 7, performing the sequence diagram 800 does not result in data frame loss or reduces the data frame loss.

Figure 9:
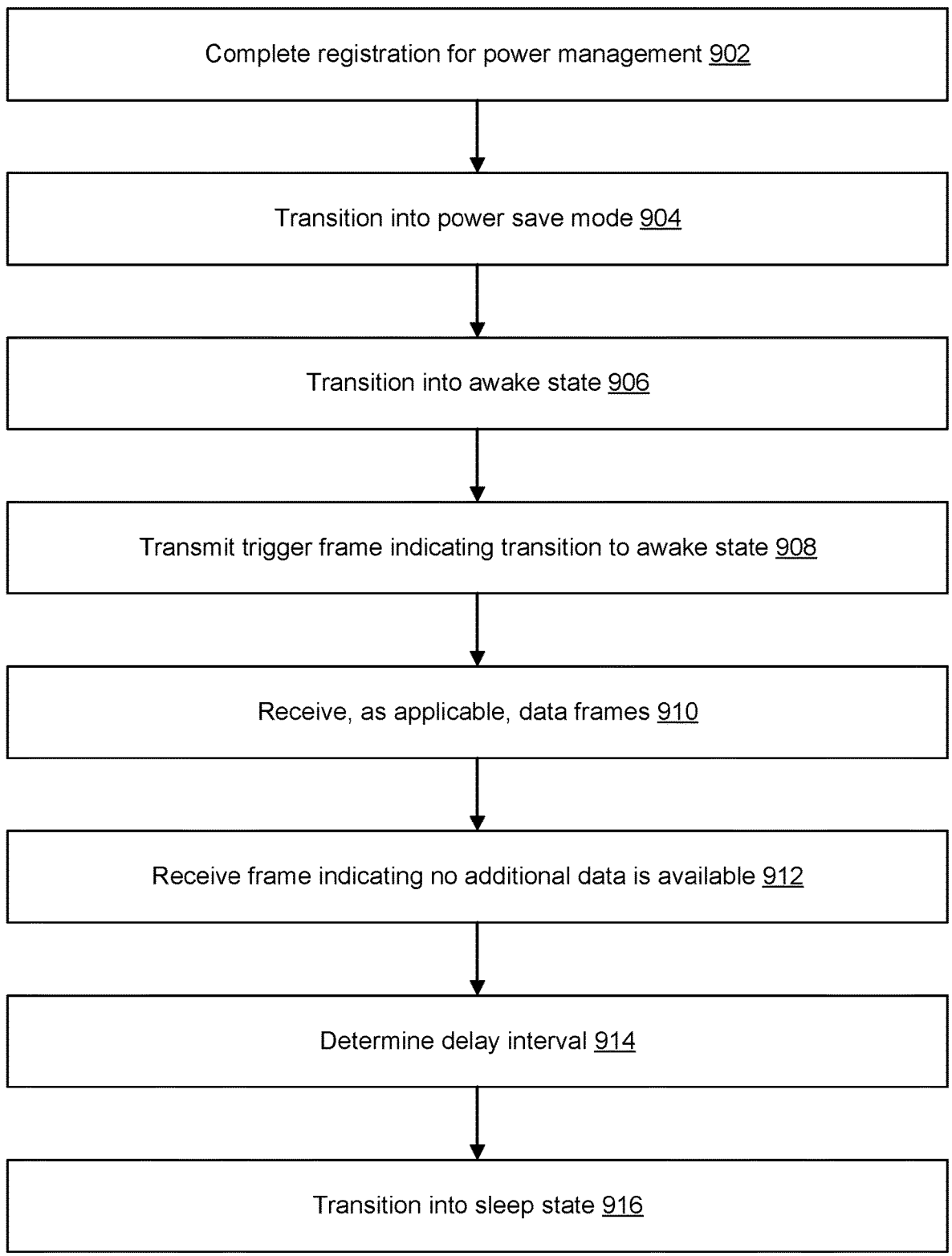
FIG. 9 illustrates an example flow of a computing device for managing data transmissions to the computing device based on power management data according to an embodiment of the present disclosure.
Figure 10:
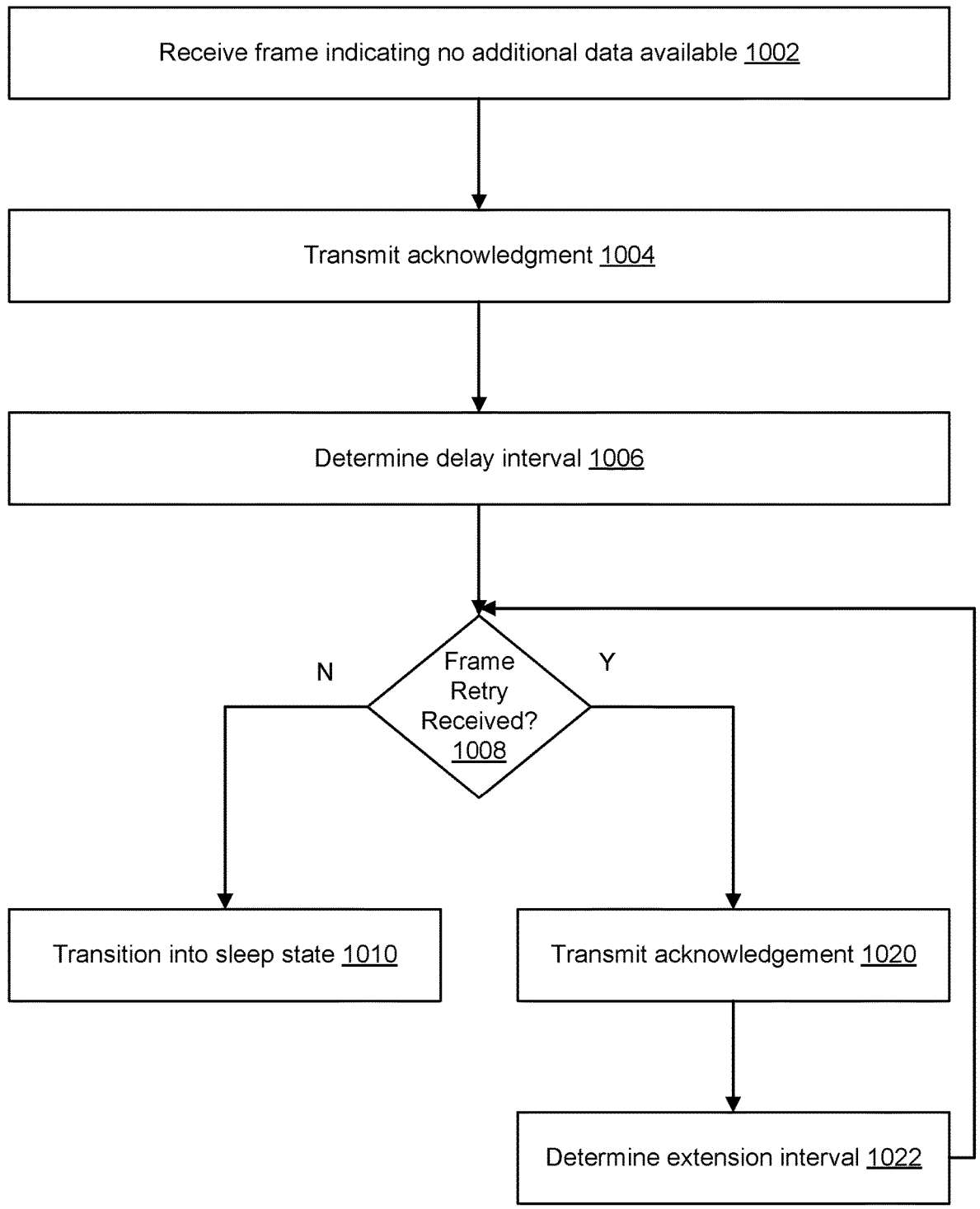
FIG. 10 illustrates another example flow of a computing device for delaying a transition into a sleep state according to an embodiment of the present disclosure.
Figure 11:
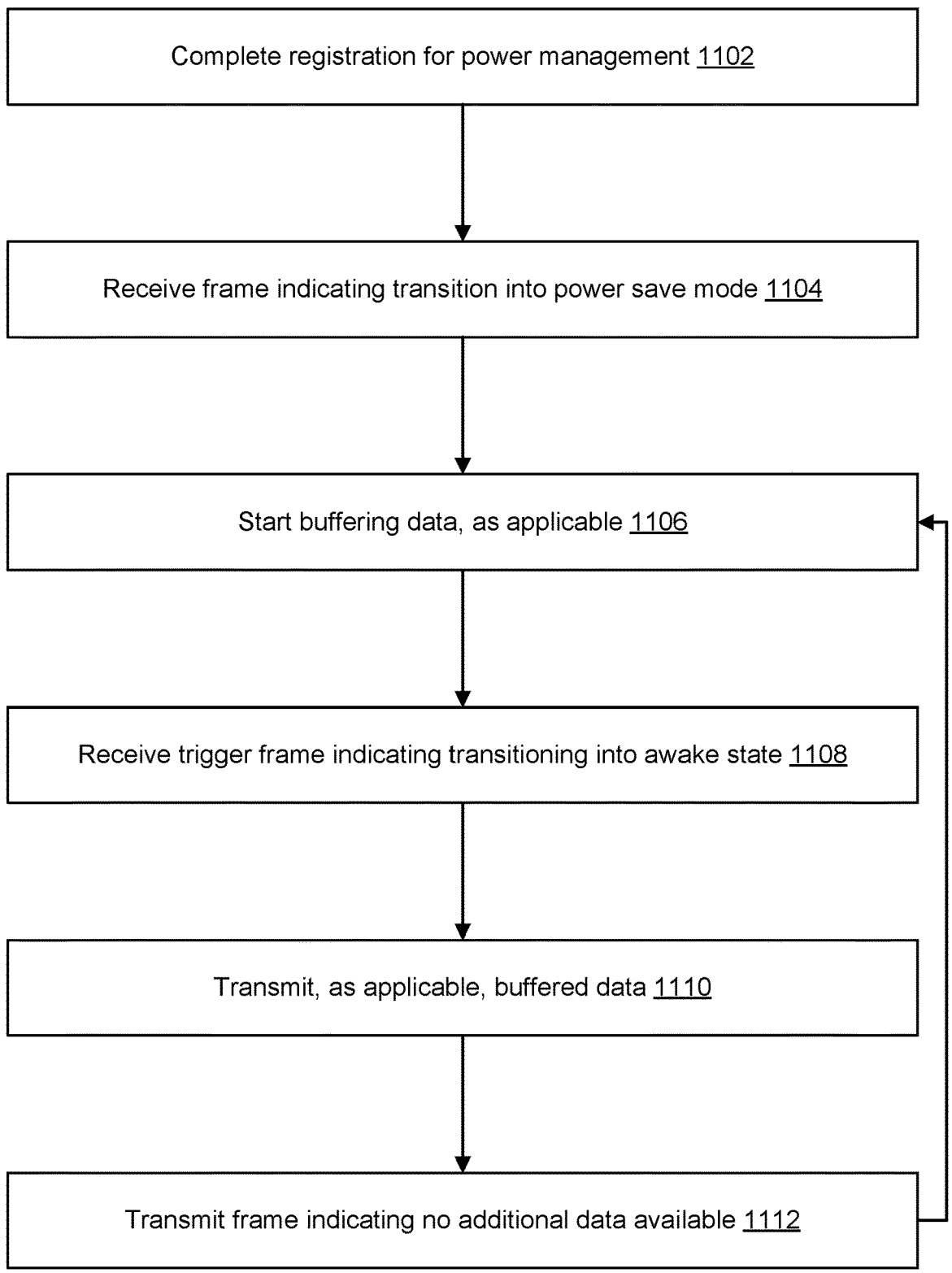
FIG. 11 illustrates another example flow of an access point for managing data transmissions to a computing device based on power management data.

FIGS. 9-11 illustrate example flows for implementing the capability of a power save mode with a sleep-awake cycle to manage data transmissions, save power, and meet latency targets. Devices that form a basic service set (BSS), including a computing device (e.g., a station) and an access point, are described as performing operations of the flows. In particular, the flows illustrated in FIGS. 9 and 10 are described from the perspective of the computing device, whereas the flow illustrated in FIG. 11 is described from the perspective of the access point. Instructions for performing the operations can be stored as computer-readable instructions on non-transitory computer-readable media of the devices. As stored, the instructions represent programmable modules that include code executable by processors of the devices. The execution of such instructions configures the devices to perform the specific operations shown in the figures and described herein. Each programmable module in combination with the respective processor represents a means for performing a respective operation(s). While the operations are illustrated in a particular order, it should be understood that no particular order is necessary and that one or more operations may be omitted, skipped, performed in parallel, and/or reordered.

FIG. 9 illustrates an example flow of the computing device for managing data transmissions to the computing device based on power management data according to an embodiment of the present disclosure. The power management data can include any or a combination of the power management registration data 212 or the power management state data 214 of FIG. 2.

In an example, the flow of FIG. 9 starts at operation 902, where the computing device completes a registration for power management. For instance, the computing device can receive a beacon from the access point advertising the capability and/or can request this capability by transmitting a probe request frame, an authentication request frame, or an association request frame to the access point. Upon registration, the access point may generate and store the power management registration data 212.

In an example, the flow of FIG. 9 includes operation 904, where the computing device transitions to a power save mode. For instance, the transition includes transmitting, to the access point, a QoS null frame if the computing device has no data or management control to transmit, a data frame if the computing has data to transmit, or a management frame if the computing device has management control to transmit. The data frame and/or the management frame can also be used in lieu of the QoS null frame when the computing device has no data or management control to transmit. In this case, the data frame and/or the management frame are protected to improve the security of the transition into the power save mode. The transmitted frame, whether QoS null frame, data frame (protected or not), or management frame (protected or not) includes PM data to indicate the transition (e.g., a PM bit set to "1").

In an example, the flow of FIG. 9 includes operation 906, where the computing device transitions to an awake state. For instance, the computing device detects a trigger event (e.g., that twenty milliseconds have passed since the transition into the power save mode) powers up a receiver of the computing device and/or enables receive functionality of the computing device. Further, the computing device determines that no data is available to transmit from the computing device to the access point at this time. Nonetheless, the computing device generates a data frame or a management frame, rather than a QoS null frame, to transmit as a trigger frame to indicate the transition into the awake state. In other words, the trigger frame is a non-QoS null frame that includes at least a header field and a payload field. In particular, the computing device generates a sequence number unique to the trigger frame and includes the sequence number in the trigger frame (e.g., in the header field).

To generate the sequence number, the computing device maintains a counter. The counter is used to track the count of the transmissions. Each time a transmission occurs, the computing device increments the count by one. The computing device increments the latest count (e.g., the current value of the counter) by one and sets the resulting value as the sequence number.

In an illustration, the computing device maintains a counter per type and category of transmission. In particular, the computing device maintains a set of counter for data frames and a set of counters for management frames. Each data frame (and similarly management frame) can be associated with a category, such as audio, video, best effort, or background. The computing device maintains a counter per category (e.g., a first counter for data frames containing audio data, a second counter for data frames containing video data, a third counter for data frames containing data categorized as best effort data, and a fourth counter for data frames containing data categorized as background data). Each time a data frame associated with a category is transmitted, only the corresponding counter is increased (e.g., if a data frame associated with the audio category is transmitted, only the first counter is increased). The value of a counter associated with a data frame can be included as a sequence number in the data frame (e.g., if a data frame associated with the audio category is transmitted, the latest value of the first counter is included in this data frame). Each counter can be increased monotonically with a transmission of a corresponding data frame, unless this transmission is a retransmission and needs to be indicated as being redundant.

In this illustration, the computing device determines a category to associate with the trigger frame, looks up the current value of the counter associated with this category, increases this value by one, and includes this increased value as the sequence number in the trigger frame. For instance, if the computing device is streaming audio and has entered the power save mode, the computing device can select the category associated with audio to then generate the sequence number from the value of the counter associated with this category.

In an example, the flow of FIG. 9 includes operation 908, where the computing device transmits the trigger frame indicating the transition into the awake state. For instance, the trigger frame is transmitted to the access point. In addition, prior to transmission, the trigger frame can be protected to improve the security associated with indicating the transition. In this case, the trigger frame, as protected, is transmitted to the access point.

In an example, the flow of FIG. 9 includes operation 910, where the computing device receives, as applicable one or more data frames from the access point. For instance, if the access point has stored data frames in a memory buffer between the time the computing device transitioned into the power save mode and the time the computing device transitioned into the awake state, such data frames can be transmitted. If no such data frames have been buffered, no such transmission is performed.

In an example, the flow of FIG. 9 includes operation 912, where the computing device receives a frame from the access point, where the frame indicates that no additional data is available. For instance, if data frames were received per operation 910, the last received data frame includes EOSP data indicating that no additional data is available for the computing device to receive from the access point (e.g., an EOSP bit set to "1"). If no data frames were received per operation 910, the computing device can receive a QoS null frame with the EOSP data. In an example, the access point uses a non-QOS null frame that includes the EOSP data even when the access point has not buffered data for transmission to the computing device. The non-QOS null frame includes a sequence number unique to the transmission of the non-QOS null frame and can be any of a data frame, including a vendor specific frame, or a management frame.

In an illustration, the frame is a data frame or a management frame that includes the EOSP data, and the frame is protected (e.g., includes an encrypted payload, where this payload includes AAD generated based on some of the information in the MAC header of the frame and encrypted with an encryption key). In this illustration, the computing device validates the protected frame and, only if the validation is successful, does the computing device determine the EOSP data and starts the transition into the sleep state. The validation includes, for instance, decrypting the payload, generating a hash from the MAC header, and determining that the hash is the same as or sufficiently similar to the AAD.

In an example, the flow of FIG. 9 includes operation 914, where the computing device determines a delay interval and defers the transition into the sleep state until an end of the delay interval. The delay interval can be configured to a static value (e.g., five milliseconds) or can be dynamically configured depending on a number of factors associated with detected channel conditions including, for instance, any or a combination of a packet error rate, a difference between an expected frame rate and a detected frame rate, or channel utilization. FIG. 10 further illustrates the determination of a dynamic value of the delay interval.

In an example, the flow of FIG. 9 includes operation 916, where the computing device transitions to the sleep state based on the EOSP data indicating no additional data and on the delay interval. For instance, the computing device starts a timer upon receiving the EOSP data and sets the duration of this timer to the value of the delay interval. If a retransmission of the EOSP data is received before the end of the timer, the computing device can determine and extend the delay interval by a time interval (e.g., extend the timer by that time interval). If no retransmission is received (or no further retransmission is received after an extension), the computing device transitions to the sleep state by powering off its receiver or disabling the receive functionalities. The value of the time interval can be also static (e.g., set at five milliseconds) or dynamic. If dynamic, this value can also be determined based on any or a combination of the factors associated with the detected channel conditions.

FIG. 10 illustrates another example flow of the computing device for delaying a transition into a sleep state according to an embodiment of the present disclosure. As described in connection with operations 914-916, the transition can be deferred by a delay interval, where this delay interval is extendable by a time interval. Any or both of the delay interval and the time interval can have a predefined static value or can have a dynamic value determined based on the factors associated with the detected channel conditions. The value of the delay interval and the value of the time interval (e.g., the time length of the extension) can be different.

In an example, the flow of FIG. 10 starts at operation 1002, where the computing device receives a frame indicating that no additional data is available. This operation is similar to operation 912 of FIG. 9.

In an example, the flow of FIG. 10 includes operation 1004, where the computing device transmits an acknowledgement to the access point about receipt of the frame. As explained in connection with FIG. 7, due to the channel conditions, the acknowledgement may not be actually received by the access point. In this case, the access point may retransmit the frame. By deferring the transition into the sleep state by the delay interval, the computing device can detect the retransmission and retransmit the acknowledgement so that the access point can be more likely determine that the computing device is transitioning into the sleep state.

In an example, the flow of FIG. 10 includes operation 1006, where the computing device determines a delay interval. For instance, the delay interval has a dynamic duration that is determined based on one or more of the packet error rate or the difference between an expected frame rate and a detected frame rate (e.g., for audio streaming, the stream can necessitate a frame rate that would be the expected frame rate. In operation, the computing device may determine an average of the number of frame rates received in a time window and set this average as the expected frame rate). Generally, the larger the packet error rate, the longer the delay interval is. Similarly, the larger the difference is, the longer the delay interval is.

In addition to using the factors associated with the detected channel conditions to compute the dynamic value of the delay interval, some or all these factors can be additionally or alternatively used as a trigger to determine the delay interval (e.g., as a trigger to perform operation 1006 and possibly defer the transition into the sleep state). For instance, if the packet error rate exceeds a predefined error rate threshold and/or if the difference exceeds a predefined value, the computing device is triggered to determine the delay interval (whether static or dynamic) and defer the transition.

In an example, the flow of FIG. 10 includes operation 1008, where the computing device stays in the awake state during the duration of the delay interval. While in the awake state, the computing device monitors whether a second frame is received from the access point and indicates that no additional data is available to the computing device (e.g., the second frame can be a retransmission of the frame received at operation 1002). If the second frame is not received, operations 1010 follows operation 1008. Otherwise, operation 1020 follows operation 1008.

In an example, the flow of FIG. 10 includes operation 1010, where the computing device transitions to the sleep state. For instance, the computing device powers off its receiver or disables its receive functionalities.

In an example, the flow of FIG. 10 includes operation 1020, where the computing device transmits an acknowledgement to the access point about receipt of the second frame. This operation can be similar to operation 1004.

In an example, the flow of FIG. 10 includes operation 1022, where the computing device determines an extension interval (e.g., a time interval by which the delay interval is extended). For instance, the duration of the extension interval can be static or can be dynamic. If dynamic, the above factors associated with the detected channel conditions can be similarly used to compute the dynamic duration. In addition, the above factors can be used as a trigger to determine the duration extension.

FIG. 11 illustrates another example flow of the access point for managing data transmissions to the computing device based on power management data. In an example, the flow of FIG. 11 starts at operation 1102, where the access point completed a registration of the computing device for power management. For instance, the access point may advertise the capability of the power save mode with the sleep-awake cycle by sending a beacon indicating so. Or, the computing device may request this capability by transmitting a probe request frame, an authentication request frame, or an association request frame to the access point. Upon registration, the access point may generate and store the power management registration data 212.

In an example, the flow of FIG. 11 includes operation 1104, where the access point receives a frame indicating a transition of the computing device into the power save mode. The frame can be a QoS null frame, a data frame, or a management frame that includes a PM bit set to "1." If the frame is a data frame or management frame, the frame can be protected (e.g., includes an encrypted payload, where this payload includes AAD generated based on some of the information in the MAC header of the frame and encrypted with an encryption key). If so, the access point validates the protected frame and, only if the validation is successful, does the computing device determine the value of the PM bit. The validation includes, for instance, decrypting the payload, generating a hash from the MAC header, and determining that the hash is the same as or sufficiently similar to the AAD. Upon determining that the PM bit is set to "1," the access point can update the power management state data 214 to indicate that the computing device is in the power save mode.

In an example, the flow of FIG. 11 includes operation 1106, where the access point starts buffering data, as applicable, for the computing device. For instance, the access point receives one or more data frames from a data source and the data frame(s) includes a MAC address of the computing device as the destination address. By looking up the power management state data 214, the access point determines that the computing device is in the power save mode and stores the data frame(s) in a memory buffer rather than immediately transmitting the data frame(s) to the computing device.

In an example, the flow of FIG. 11 includes operation 1108, where the access point receives a trigger frame indicating the transition of the computing device to the awake state. For instance, the trigger frame can be a data frame or a management frame and can include a sequence number unique to the trigger frame and a PM bit set to "0." The trigger frame can also be protected, similarly to the frame described in connection with operation 1104. If protected, the trigger frame is validated prior to additional processing (similarly to the validation described in connection with operation 1104). If not protected or if protected and upon successful validation, the access point determines the sequence number and the value of the PM bit. Because the sequence number is unique, the access point does not discard the trigger frame. Because the PM bit is set to "0," the access point determines that the computing device has indeed transitioned into the awake state. The access point can update the power management state data 214 to indicate that the computing device is in the awake state while also being in the power save mode.

In an example, the flow of FIG. 11 includes operation 1110, where the access point transmits, as applicable, buffered data. For instance, data frames that were stored in the memory buffer per operation 1106 are transmitted to the computing device because the computing device is in the awake state. Any data frames received while the computing device is in the awake state and destined to the computing device are also transmitted by the access point to the computing device.

In an example, the flow of FIG. 11 includes operation 1112, where the access point transmits a frame indicating that no additional data is available for the computing device to receive from the access point. Upon receiving an acknowledgment about this frame from the computing device, the access point can update the power management state data 214 to indicate that the computing device is in sleep state while also being in the power save mode. The frame can be a QoS null frame, a data frame, or a management frame. The data frame or the management frame can be used even when the access point has not buffered data for transmission to the computing device. The data frame can be a vendor specific frame. If the frame is a data frame or a management frame, this frame can also be protected.

Figure 12:
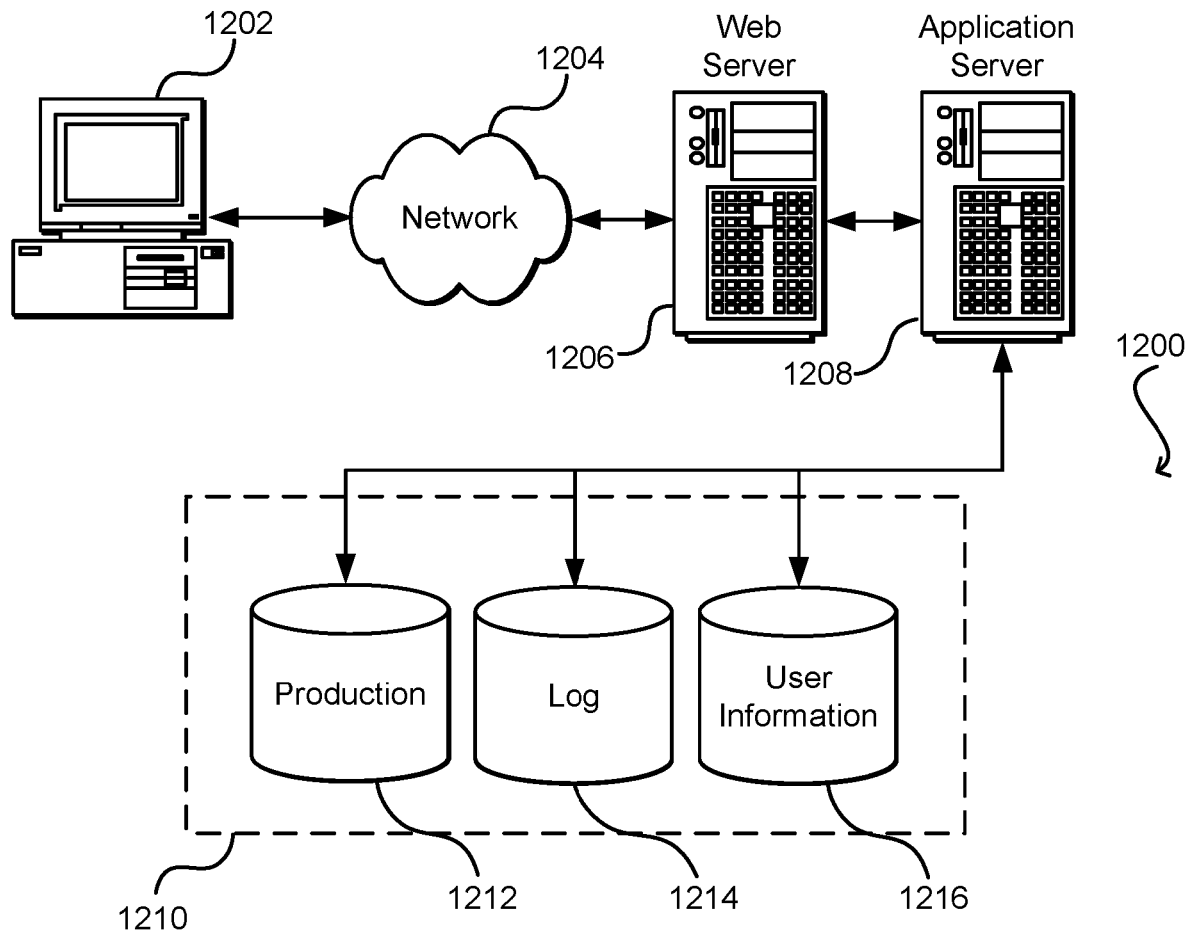
FIG. 12 illustrates a diagram showing an example of computer architecture according to an embodiment of the present disclosure.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

What is claimed is:

1. A method implemented by a device, the method including:
    transmitting, to an access point, a first frame indicating a first transition of the device to a power save mode according to a 802.11 wireless protocol; and
    while in the power save mode and during a cycle starting with a second transition of the device into an awake state and ending with a third transition of the device into a sleep state according to an 802.11 unscheduled automatic power save delivery (U-APSD) protocol:
        transitioning into the awake state after an amount of time from the first transition of the device to the power save mode;
        determining that the device has no data to transmit to the access point;
        determining, from a counter, a sequence number associated with data transmission from the device to the access point, the device increasing the counter sequentially per data transmission;
        generating an address resolution protocol (ARP) frame that includes the sequence number and a power management bit, the power management bit set to a value indicating that the device is in the awake state;
        transmitting the ARP frame to the access point;
        receiving, during the cycle, data from the access point, the data being stored in memory buffer of the access point prior to the ARP frame being transmitted, the data being transmitted by the access point in response to the ARP frame;
        receiving, from the access point, end of service period (EOSP) data indicating that the access point has no additional data to transmit to the device during the cycle; and
        transitioning into the sleep state.

2. The method of claim 1, further including protecting the ARP frame by at least:
    generating authentication data by hashing a media access control (MAC) header of the ARP frame;
    encrypting the authentication data; and
    including the authentication data as encrypted in a payload field of the ARP frame, wherein the data is transmitted by the access point following a decryption of the payload field and a validation of the authentication data by the access point.

3. The method of claim 1, further including:
    determining, upon receiving the EOSP data, a delay interval, the delay interval being predefined for the cycle;
    transmitting, to the access point, a first acknowledgment of the EOSP data being received;
    staying in the awake state after receiving the EOSP data and for a duration of the delay interval;
    receiving, during the delay interval, a retransmission of the EOSP data; and
    transmitting, to the access point, a second acknowledgment of the retransmission of the EOSP data, wherein transitioning into the sleep state is performed at an end of the delay interval.

4. A device including:
    one or more processors; and
    one or more memories storing computer-readable instructions that, upon execution by the one or more processors, configure the device to:
        enter into a power save mode; and
        while in the power save mode:
            transition into an awake state after an amount of time from entering into the power save mode;
            determine that the device has no data to transmit to a network access device;
            determine a sequence number associated with data transmission to the network access device;
            generate a frame that includes a header field and a payload field, the header field including the sequence number and power management data of the device, the power management data indicating a transition of the device into the awake state; and
            transmit the frame to the network access device.

5. The device of claim 4, wherein the one or more memories store further computer-readable instructions that, upon execution by the one or more processors, configure the device to:
    receive, while in the awake state, a second frame from the network access device, the second frame including an end of service period (EOSP) bit indicating that the network access device has no data to transmit to the device;
    determine a delay interval;
    stay in the awake state after receiving the second frame and for a duration of the delay interval; and
    transition into a sleep state at an end of the delay interval.

6. The device of claim 4, wherein the one or more memories store further computer-readable instructions that, upon execution by the one or more processors, configure the device to:
    determine a category associated with the data transmission, the category being one of: audio data transmission, video data transmission, background data transmission, or best effort data transmission;
    determine a counter that is associated with the category and that stores a count of previous data transmissions; and
    generate the sequence number by increasing the count.

7. The device of claim 4, wherein the frame is a vendor specific frame that includes a logical link control (LLC) header and a subnetwork access protocol (SNAP) header, and wherein the sequence number is included in the LLC header, and wherein the payload field is included in the SNAP header.

8. The device of claim 4, wherein the frame is a vendor specific frame, and wherein the one or more memories store further computer-readable instructions that, upon execution by the one or more processors, configure the device to:
    transition into a sleep state;
    generate a second sequence number associated with the data transmission;

generate an address resolution protocol (ARP) frame that includes the second sequence number and second power management data of the device, the second power management data indicating another transition of the device to the awake state; and transmit the ARP frame to the network access device.

9. The device of claim 4, wherein the one or more memories store further computer-readable instructions that, upon execution by the one or more processors, configure the device to:

receive, while in the awake state, data from the network access device;

receive, from the network access device, end of service period (EOSP) data indicating that the network access device has no additional data to transmit to the device; and transition into a sleep state.

10. The device of claim 9, wherein the one or more memories store additional computer-readable instructions that, upon execution by the one or more processors, configure the device to:

transmit, to the network access device and while in the awake state, an acknowledgement about receipt of the EOSP data;

remain in the awake state for a duration of a delay interval;

determine that the EOSP data was not retransmitted by the network access device during the duration; and transition into the sleep state at an end of a delay interval.

11. The device of claim 9, wherein the one or more memories store additional computer-readable instructions that, upon execution by the one or more processors, configure the device to:

transmit, to the network access device and while in the awake state, an acknowledgement about receipt of the EOSP data;

remain in the awake state for a duration of a delay interval;

determine that the EOSP data was retransmitted by the network access device during the duration;

extend the duration of the delay interval by an extension interval; and transition into the sleep state at an end of the delay interval as extended by the extension interval.

12. The device of claim 4, wherein the frame is an ARP frame, and wherein the one or more memories store further computer-readable instructions that, upon execution by the one or more processors, configure the device to:

receive, while in the awake state and from the network access device, a quality of service (QOS) null frame indicating that the network access device has no data to transmit to the network access device;

transmit, to the network access device and while in the awake state, an acknowledgement about receipt of the QOS null frame; and transition into a sleep state at an end of a delay interval.

13. One or more non-transitory computer-readable storage media storing instructions that, upon execution on a device, cause the device to perform operations that include:

entering into a power save mode; and while in the power save mode:

transitioning into an awake state after an amount of time from entering into the power save mode;

determining that the device has no data to transmit to a network access device;

determining a sequence number associated with data transmission to the network access device;

generating a frame that includes a header field and a payload field, the header field including the sequence number and power management data of the device, the power management data indicating a transition of the device to the awake state; and transmitting the frame to the network access device.

14. The one or more non-transitory computer-readable storage media of claim 13, further storing second instructions that, upon execution on the device, cause the device to perform second operations that include:

receiving, while in the awake state and from the network access device, a QoS null frame, data frame, or a vendor specific frame indicating that the network access device has no data to transmit to the network access device; and transitioning into a sleep state based at least in part on a delay interval.

15. The one or more non-transitory computer-readable storage media of claim 14, further storing third instructions that, upon execution on the device, cause the device to perform third operations that include:

determining the delay interval based at least in part on one or more of: a packet error rate, or a difference between an expected frame rate and a detected frame rate, wherein the sleep state is transitioned into at an end of the delay interval.

16. The one or more non-transitory computer-readable storage media of claim 13, further storing second instructions that, upon execution on the device, cause the device to perform second operations that include:

receiving, while in the awake state and from the network access device, a QoS null frame, data frame, or a vendor specific frame indicating that the network access device has no data to transmit to the network access device;

determining a trigger to delay a transition into a sleep state, the trigger comprising at least one of: a packet error rate, or a difference between an expected frame rate and a detected frame rate; and transitioning into the sleep state at an end of a delay interval.

17. The one or more non-transitory computer-readable storage media of claim 16, wherein a duration of the delay interval is based at least in part on the packet error rate or the difference between the expected frame rate and the detected frame rate.

18. The one or more non-transitory computer-readable storage media of claim 13, further storing second instructions that, upon execution on the device, cause the device to perform second operations that include:

receiving, while in the awake state and from the network access device, a QoS null frame, data frame, or a vendor specific frame indicating that the network access device has no data to transmit to the network access device;

refraining from transitioning into a sleep state for a duration of a delay interval;

receiving, during the delay interval and from the network access device, a retransmission of the frame from the network access device;

extending the duration of the delay interval by an extension interval; and transitioning into the sleep state at an end of the delay interval as extended by the extension interval.

19. The one or more non-transitory computer-readable storage media of claim 18, wherein a duration of the extension interval is based at least in part on a number of extensions of the delay interval.

20. The one or more non-transitory computer-readable storage media of claim 13, wherein the frame is a first protected frame that comprises encrypted authentication data in the payload field, and further storing second instructions that, upon execution on the device, cause the device to perform second operations that include:
- receiving, while in the awake state and from the network access device, a second protected frame indicating that the network access device has no data to transmit to the network access device;
- validating the second protected frame; and
- transitioning into a sleep state.

* * * * *